(12) United States Patent
Lim

(10) Patent No.: US 11,416,100 B2
(45) Date of Patent: Aug. 16, 2022

(54) DISPLAY DEVICE

(71) Applicant: Samsung Display Co., Ltd., Yongin-Si (KR)

(72) Inventor: Sanghyun Lim, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/337,864

(22) Filed: Jun. 3, 2021

(65) Prior Publication Data
US 2022/0137773 A1    May 5, 2022

(30) Foreign Application Priority Data
Oct. 29, 2020   (KR) .......................... 10-2020-0142485

(51) Int. Cl.
*G06F 3/041*     (2006.01)
*G09G 3/20*      (2006.01)
*G06F 3/046*     (2006.01)

(52) U.S. Cl.
CPC .......... *G06F 3/04166* (2019.05); *G06F 3/046* (2013.01); *G09G 3/20* (2013.01); *G09G 2310/08* (2013.01)

(58) Field of Classification Search
CPC ....... G06F 3/04166; G06F 3/046; G09G 3/20; G09G 2310/08
See application file for complete search history.

(56) References Cited

U.S. PATENT DOCUMENTS

| | | | |
|---|---|---|---|
| 2011/0205344 A1* | 8/2011 | Lee ........................ | H04N 7/087 348/51 |
| 2014/0240259 A1 | 8/2014 | Park et al. | |
| 2017/0102798 A1* | 4/2017 | Qiao ...................... | G06F 3/0442 |
| 2018/0260067 A1* | 9/2018 | Choi ...................... | G06F 3/0443 |

FOREIGN PATENT DOCUMENTS

| | | |
|---|---|---|
| KR | 1020060118200 A | 11/2006 |
| KR | 101536228 B1 | 7/2015 |

* cited by examiner

*Primary Examiner* — Lisa S Landis
(74) *Attorney, Agent, or Firm* — Cantor Colburn LLP

(57) ABSTRACT

A display device includes a display panel which displays an image, a touch sensor which senses a touch, a display controller which drives the display panel, and a touch controller which drives the touch sensor. The display controller transfers a timing signal representing a timing of a display operation to the touch controller, and provides display driving information to the touch controller by modulating the timing signal in a blank period of a frame period.

20 Claims, 23 Drawing Sheets

DISPLAY DEVICE

This application claims priority to Korean Patent Application No. 10-2020-0142485, filed on Oct. 29, 2020, and all the benefits accruing therefrom under 35 U.S.C. § 119, the content of which in its entirety is herein incorporated by reference.

BACKGROUND

1. Field

Embodiments relate to a display device, and more particularly to a display device providing display information to a peripheral device.

2. Description of the Related Art

A display device may include one or more peripheral devices providing various functions, or may be coupled to the peripheral devices. The peripheral devices may include a touch sensing device for sensing a touch, an electromagnetic resonance ("EMR") digitizer for sensing an EMR pen, a Wi-Fi device for performing Wi-Fi communication, a Bluetooth device for performing Bluetooth communication, etc., for example.

SUMMARY

A display operation of a display device and an operation of a peripheral device may be affected by each other. A driving voltage of the display device may be distorted by a touch sensing operation of a touch sensing device, or a touch driving voltage of the touch sensing device may be distorted by the display operation of the display device.

Some embodiments provide a display device that provides display information to a peripheral device.

In an embodiment of the invention, a display device includes a display panel which displays an image, a touch sensor which senses a touch, a display controller which drives the display panel, and a touch controller which drives the touch sensor. The display controller transfers a timing signal representing a timing of a display operation to the touch controller, and provides display driving information to the touch controller by modulating the timing signal in a blank period of a frame period.

In an embodiment, the display controller may provide the display driving information to the touch controller by modulating at least one of a pulse existence of the timing signal in each of horizontal time durations of the blank period, a pulse phase of the timing signal in the blank period, and a pulse width of the timing signal in the blank period.

In an embodiment, the display driving information may include at least one of frame rate information about a frame rate at which the display panel is driven, scan mode information for the display panel, and driving voltage information for the display panel.

In an embodiment, the timing signal may include a vertical synchronization signal representing a timing of the frame period, and a horizontal synchronization signal representing a timing of each of horizontal time durations.

In an embodiment, the display controller may transfer driving information data representing the display driving information to the touch controller in the blank period by encoding the horizontal synchronization signal in the blank period such that whether the horizontal synchronization signal has a pulse in each of horizontal time durations of the blank period is mapped to each bit of the driving information data.

In an embodiment, the display controller may toggle the vertical synchronization signal at a start time point of the blank period to inform the touch controller of a transfer start timing of the driving information data.

In an embodiment, the display controller may modulate the vertical synchronization signal such that the vertical synchronization signal has a first edge at a start time point of the blank period to inform the touch controller of a transfer start timing of the driving information data, and has a second edge at an end time point of the blank period to inform the touch controller of a transfer end timing of the driving information data.

In an embodiment, the display controller may transfer driving information data representing the display driving information to the touch controller in the blank period by encoding the horizontal synchronization signal in the blank period such that a phase of a pulse of the horizontal synchronization signal from a start time point of the blank period is mapped to the driving information data.

In an embodiment, the display controller may toggle the vertical synchronization signal at the start time point of the blank period to inform the touch controller of a transfer start timing of the driving information data.

In an embodiment, the display controller may modulate the vertical synchronization signal such that the vertical synchronization signal has a first edge at the start time point of the blank period to inform the touch controller of a transfer start timing of the driving information data, and has a second edge at an end time point of the blank period to inform the touch controller of a transfer end timing of the driving information data.

In an embodiment, the display controller may transfer driving information data representing the display driving information to the touch controller in the blank period by encoding the vertical synchronization signal in the blank period such that a width of a pulse of the vertical synchronization signal in the blank period is mapped to the driving information data.

In an embodiment, the display controller may periodically toggle the horizontal synchronization signal in the blank period.

In an embodiment, the display controller may maintain the horizontal synchronization signal at a constant level in the blank period to inform the touch controller of a transfer timing of the driving information data.

In an embodiment, the display controller may transfer driving information data representing the display driving information to the touch controller in the blank period by encoding the vertical synchronization signal in the blank period such that a phase of a pulse of the vertical synchronization signal from a start time point of the blank period is mapped to the driving information data.

In an embodiment, the display controller may periodically toggle the horizontal synchronization signal in the blank period.

In an embodiment, the display controller may maintain the horizontal synchronization signal at a constant level in the blank period to inform the touch controller of a transfer timing of the driving information data.

In an embodiment, the timing signal may include a data enable signal representing a timing of effective image data, and a horizontal synchronization signal representing a timing of each of horizontal time durations.

In an embodiment, the display controller may provide the display driving information to the touch controller by modulating at least one of a pulse existence of the data enable signal in each of horizontal time durations of the blank period, a pulse phase of the data enable signal in the blank period, and a pulse width of the data enable signal in the blank period.

In an embodiment, a display device includes a display panel which displays an image, a peripheral device, and a display controller which drives the display panel. The display controller transfers a timing signal representing a timing of a display operation to the peripheral device, and provides display driving information to the peripheral device by modulating the timing signal in a blank period of a frame period.

In an embodiment, the peripheral device may include at least one of a touch sensing device for sensing a touch, an electro-magnetic resonance digitizer for sensing an electro-magnetic resonance pen, a Wi-Fi device for performing Wi-Fi communication, and a Bluetooth device for performing Bluetooth communication.

As described above, in an embodiment of a display device, a display controller may transfer a timing signal representing a timing of a display operation to a peripheral device (e.g., a touch controller of a touch sensing operation), and may provide display driving information to the peripheral device by modulating the timing signal in a blank period of a frame period. Accordingly, the display driving information may be provided to the peripheral device without a dedicated channel for providing the display driving information, and interference between the display operation of the display device and an operation of the peripheral device may be reduced or prevented.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
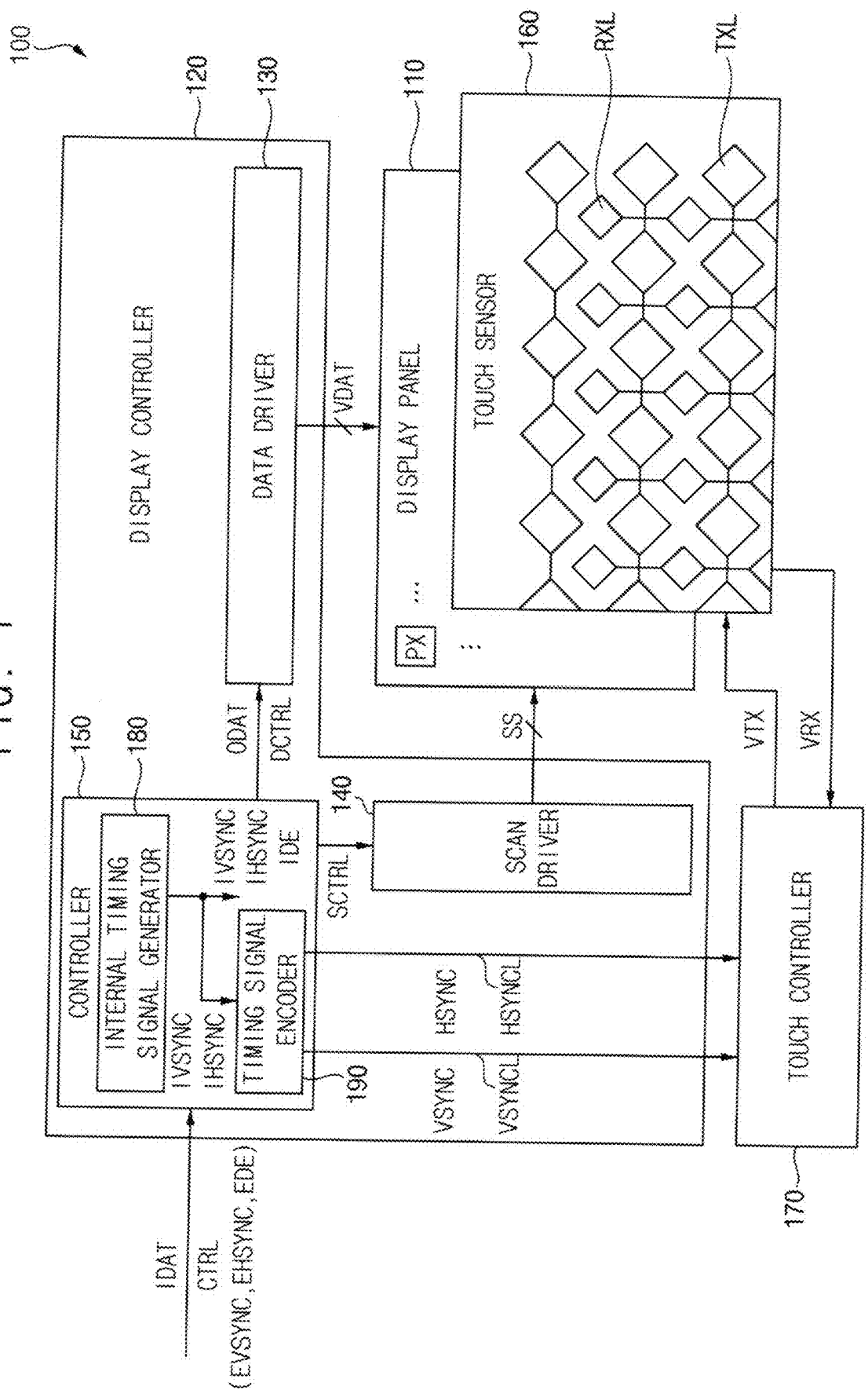
FIG. 1 is a block diagram illustrating an embodiment of a display device.

Hereinafter, embodiments of the invention will be explained in detail with reference to the accompanying drawings. Like or similar reference numerals refer to like or similar elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component,"

"region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 2:
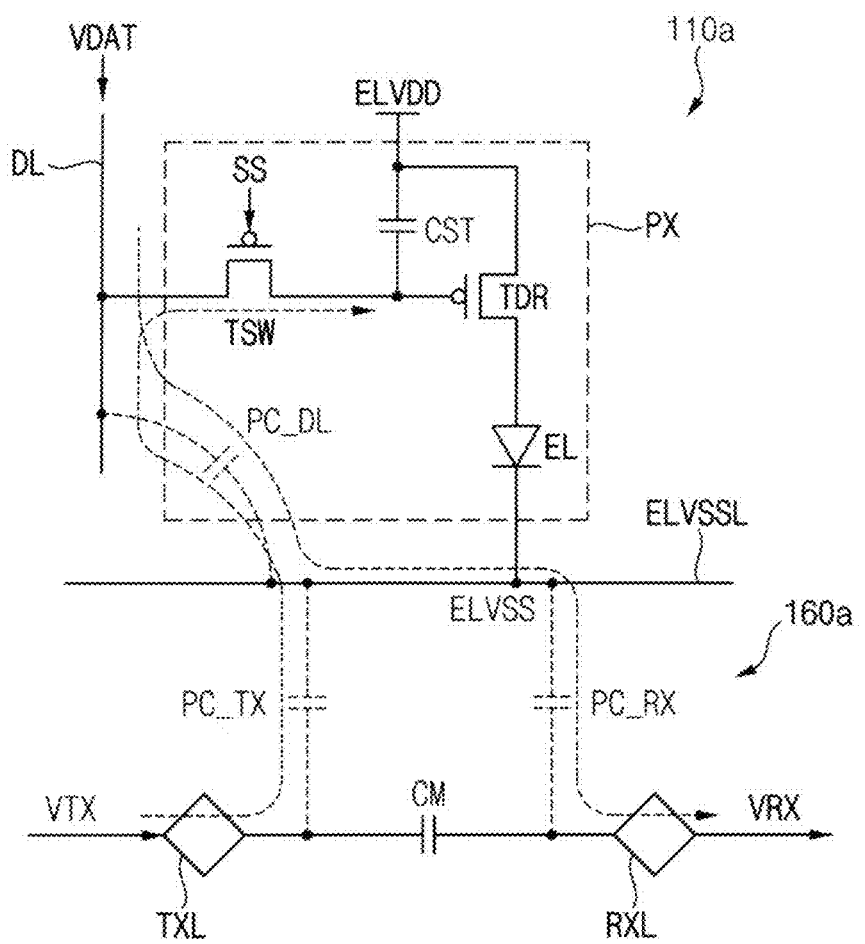
FIG. 2 is a diagram illustrating a portion of a display panel and a portion of a touch sensor.
Figure 3:
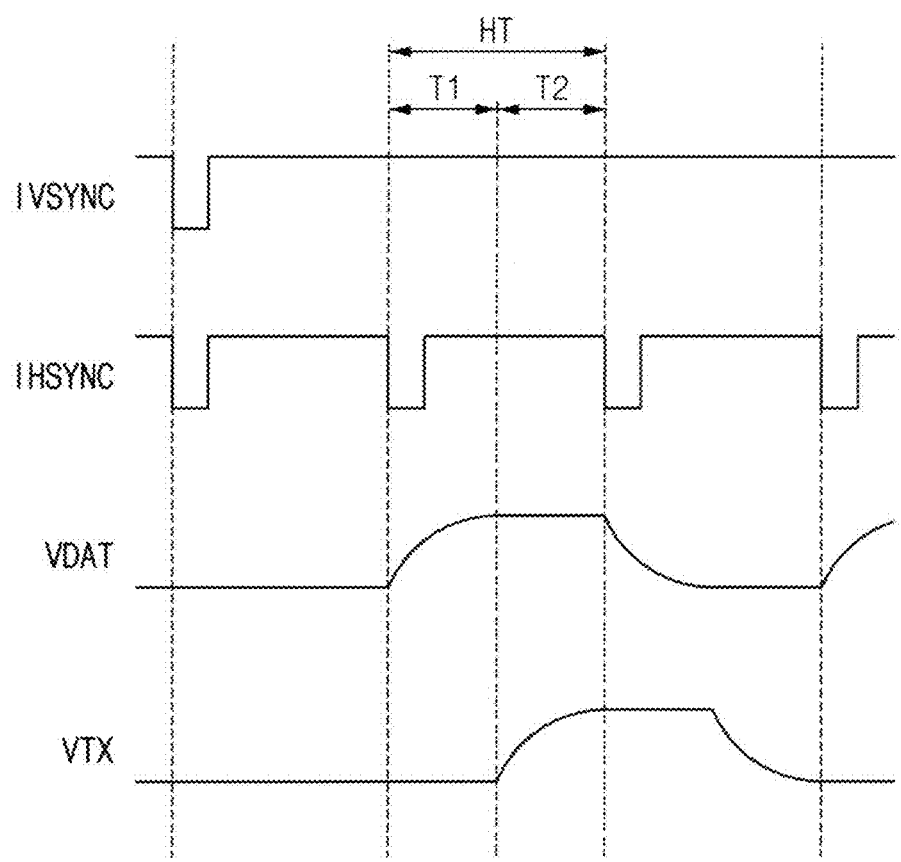
FIG. 3 is a timing diagram for describing an embodiment of a display operation and a touch sensing operation.
Figure 4:
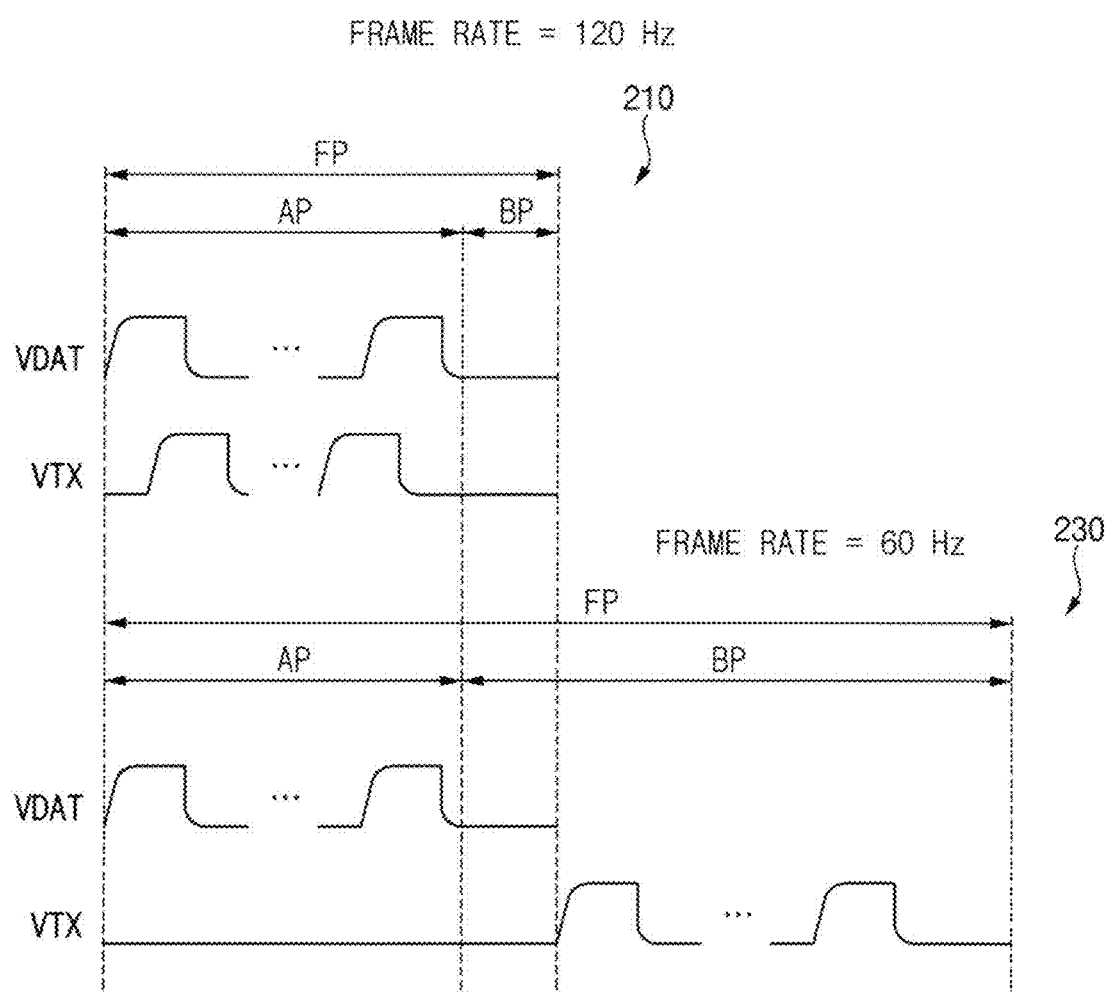
FIG. 4 is a timing diagram for describing embodiments of display operations and touch sensing operations according to a frame rate.
Figure 5:
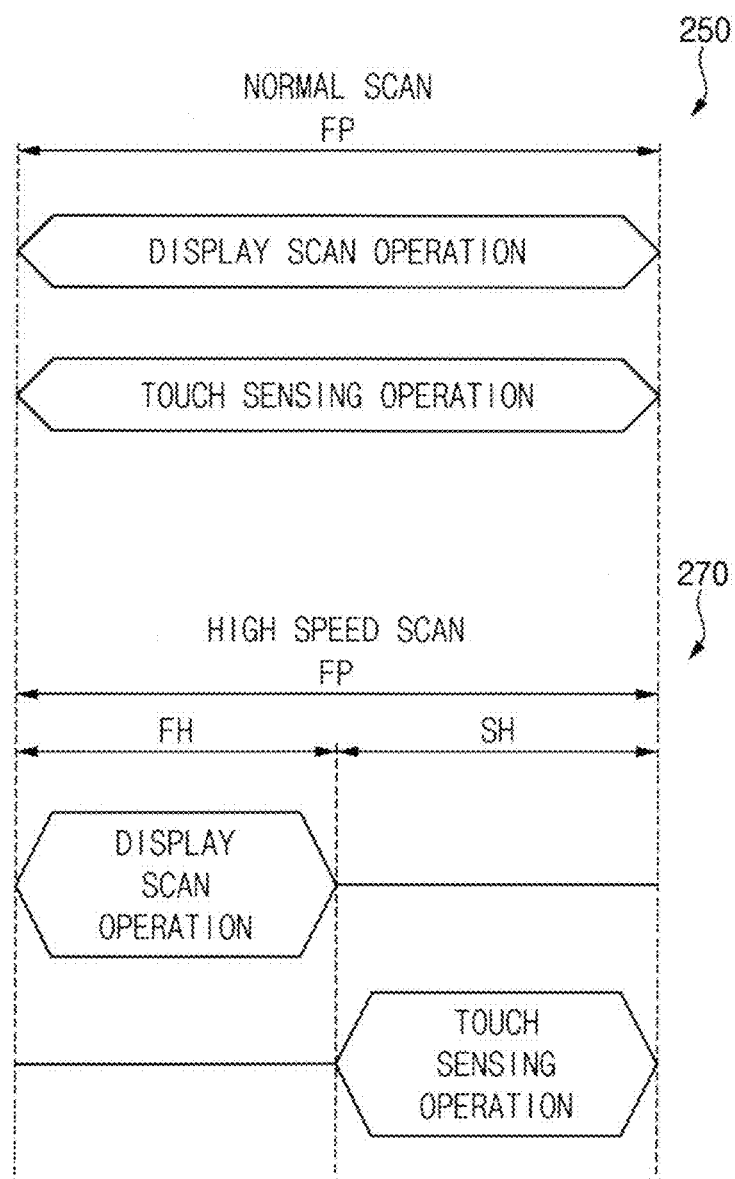
FIG. 5 is a timing diagram for describing embodiments of display operations and touch sensing operations according to a scan mode.

FIG. 1 is a block diagram illustrating an embodiment of a display device, FIG. 2 is a diagram illustrating a portion of a display panel and a portion of a touch sensor, FIG. 3 is a timing diagram for describing an embodiment of a display operation and a touch sensing operation, FIG. 4 is a timing diagram for describing embodiments of display operations and touch sensing operations according to a frame rate, and FIG. 5 is a timing diagram for describing embodiments of display operations and touch sensing operations according to a scan mode.

Referring to FIG. 1, a display device 100 in embodiments may include a display panel 110 for displaying an image, a display controller 120 for driving the display panel 110, a touch sensor 160 for sensing a touch, and a touch controller 170 for driving the touch sensor 160. Although FIG. 1 illustrates an embodiment where the display controller 120 provides a timing signal (e.g., a vertical synchronization signal VSYNC and a horizontal synchronization signal HSYNC) to a touch sensing device including the touch sensor 160 and the touch controller 170, in embodiments, the display controller 120 may provide the timing signal to any peripheral device.

The display panel 110 may be driven by the display controller 120 to display an image. The display panel 110 may include a plurality of data lines, a plurality of scan lines, and a plurality of pixels PX coupled to the plurality of data lines and the plurality of scan lines. In some embodiments, the display panel 110 may be an organic light emitting diode ("OLED") display panel where each pixel PX includes the OLED.

In an embodiment, as illustrated in FIG. 2, each pixel PX may include a switching transistor TSW, a storage capacitor CST, a driving transistor TDR and an OLED EL, for example. The switching transistor TSW may transfer a data voltage VDAT of a data line DL to the storage capacitor CST in response to a scan signal SS. The storage capacitor CST may store the data voltage VDAT transferred by the switching transistor TSW. The driving transistor TDR may generate a driving current based on the data voltage VDAT stored in the storage capacitor CST. The OLED EL may emit light based on the driving current flowing from a line of a high power supply voltage ELVDD to a line of a low power supply voltage ELVSS.

Although FIG. 2 illustrates an embodiment of the pixel PX having a two-transistor-one-capacitor ("2T1C") structure, the pixel PX of the display device 100 in embodiments is not limited to the embodiment of FIG. 2. Further, the display panel 110 is not limited to the OLED display panel, and may be any other suitable display panel. In an embodiment, the display panel 110 may be a liquid crystal display ("LCD") panel, a light emitting diode ("LED") display panel, a field emission display ("FED") panel, or the like, for example.

The display controller 120 may perform a display operation that drives the display panel 110 based on input image data IDAT and a control signal CTRL received from an external host processor (e.g., an application processor ("AP"), a graphic processing unit ("GPU") or a graphics card). In some embodiments, the input image data IDAT may be RGB image data including red image data, green image data and blue image data. Further, in some embodiments, the control signal CTRL may include, but not limited to, an external vertical synchronization signal EVSYNC, an external horizontal synchronization signal EHSYNC, an external data enable signal EDE, a master clock signal, etc. In some embodiments, as illustrated in FIG. 1, the display controller 120 may include a data driver 130 for providing the data voltages VDAT to the plurality of pixels PX, a scan driver 140 for providing the scan signals SS to the plurality of pixels PX, and a controller 150 for controlling the data driver 130 and the scan driver 140.

The data driver 130 may generate the data voltages VDAT based on a data control signal DCTRL and output image data ODAT received from the controller 150, and may provide the data voltages VDAT to the plurality of pixels PX through the plurality of data lines. In some embodiments, the data control signal DCTRL may include, but not limited to, an internal data enable signal IDE, a horizontal start signal generated based on an internal horizontal synchronization signal IHSYNC, a load signal, etc. In some embodiments, the data driver 130 and the controller 150 may be implemented as a single integrated circuit ("IC"), and the single IC may be also referred to as a timing controller embedded data driver ("TED"). In other embodiments, the data driver 130 and the controller 150 may be implemented with separate ICs.

The scan driver 140 may generate the scan signals SS based on a scan control signal SCTRL received from the controller 150, and may sequentially provide the scan signals SS to the plurality of pixels PX through the plurality of scan lines on a row-by-row basis. In some embodiments, the scan control signal SCTRL may include, but not limited to, a scan start signal generated based on an internal vertical synchronization signal IVSYNC, a scan clock signal, etc. In some embodiments, the scan driver 140 may be integrated or disposed in a peripheral portion of the display panel 110. In other embodiments, the scan driver 140 may be implemented with one or more ICs.

The controller 150 (e.g., a timing controller ("TCON")) may receive input image data IDAT and a control signal CTRL from the external host processor (e.g., the AP, the GPU or the graphics card). The controller 150 may generate the output image data ODAT, the data control signal DCTRL and the scan control signal SCTRL based on the input image data IDAT and the control signal CTRL. In some embodiments, the controller 150 may include an internal timing signal generator 180 that generates a timing signal representing a timing of the display operation based on the control signal CTRL, and may generate the data control signal DCTRL and the scan control signal SCTRL based on the timing signal generated by the internal timing signal generator 180. In an embodiment, the internal timing signal generator 180 may generate, as the timing signal, the internal vertical synchronization signal IVSYNC, the internal horizontal synchronization signal IHSYNC and the internal data enable signal IDE suitable for the display operation based on the external vertical synchronization signal EVSYNC, the external horizontal synchronization signal EHSYNC and the external data enable signal EDE received from the external host processor, for example. The controller 150 may control the data driver 130 by providing the output image data ODAT and the data control signal DCTRL to the data driver 130, and may control the scan driver 140 by providing the scan control signal SCTRL to the scan driver 140.

The touch sensor 160 may be a capacitive touch sensor that detects a change in capacitance caused by a touch of a conductive object (e.g., a finger, a stylus pen, etc.). In an embodiment, as illustrated in FIG. 1, the touch sensor 160 may include, but not limited to, a plurality of touch driving lines TXL extending in a first direction, and a plurality of touch sensing lines RXL extending in a second direction different from (or, alternatively, substantially the same as) the first direction, for example. Further, as illustrated in FIG. 1, each touch driving line TXL may include touch driving electrodes coupled to each other, each touch sensing line RXL may include touch sensing electrodes coupled to each other, and each of the touch driving electrodes and the touch sensing electrodes may have a diamond shape. However, a structure or a shape of each touch driving line, each touch sensing line, each touch driving electrode and/or each touch sensing electrode is not limited thereto. Further, in embodiments, the touch sensor 160 may be an add-on type touch sensor that is attached on the display panel 110, or an embedded type touch sensor disposed within the display panel 110. In an embodiment, the touch sensor 160 may be, but not limited to, an on-cell type embedded touch sensor, or an in-cell type embedded touch sensor, for example.

The touch controller 170 may detect presence, proximity and/or a location of the touch of the conductive object by performing a touch sensing operation that drives the touch sensor 160. In an embodiment, the touch controller 170 may provide a touch driving voltage VTX to the plurality of touch driving lines TXL. A touch sensing voltage VRX may be induced at the plurality of touch sensing lines RXL based on the touch driving voltage VTX by capacitive coupling or a mutual capacitance between the plurality of touch driving lines TXL and the plurality of touch sensing lines RXL, for example. The touch controller 170 may receive the touch sensing voltage VRX, and may sense the touch by detecting a change of the mutual capacitance caused by the touch of the conductive object based on the touch sensing voltage VRX.

Generally, the display operation by the display controller 120 and the touch sensing operation by the touch controller 170 may be affected by each other. FIG. 2 illustrates a portion 110a of the display panel 110 and a portion 160a of the touch sensor 160 to describe interference between the display operation and the touch sensing operation. In an embodiment, as illustrated in FIG. 2, a data line parasitic capacitor PC_DL may be provided between the data line DL and a low power supply voltage line ELVSSL, a touch driving line parasitic capacitor PC_TX may be provided between the low power supply voltage line ELVSSL and the touch driving line TXL, and a touch sensing line parasitic capacitor PC_RX may be provided between the low power supply voltage line ELVSSL and the touch sensing line RXL, for example. In this case, the touch driving voltage VTX for the touch sensing operation may interfere with the data voltage VDAT for the display operation through the touch driving line parasitic capacitor PC_TX and the data line parasitic capacitor PC_DL, and the data voltage VDAT for the display operation may interfere with the touch sensing voltage VRX and/or the touch driving voltage VTX through the data line parasitic capacitor PC_DL and the touch sensing line parasitic capacitor PC_RX (or the touch driving line parasitic capacitor PC_TX and a mutual capacitor CM between the touch driving line TXL and the touch sensing line RXL).

To reduce or prevent the interference between the display operation and the touch sensing operation, in embodiments of the display device 100, the display controller 120 may transfer the timing signal representing the timing of the display operation to the touch controller 170, and the touch controller 170 may perform the touch sensing operation in a timing different from the timing of the display operation based on the timing signal. In some embodiments, as illustrated in FIG. 1, the display controller 120 may transfer, as the timing signal, the vertical synchronization signal VSYNC (or the internal vertical synchronization signal IVSYNC) representing a timing (e.g., a start timing) of each frame period through a vertical synchronization signal line VSYNCL, and the horizontal synchronization signal HSYNC (or the internal horizontal synchronization signal IHSYNC) representing a timing (e.g., a start timing) of each horizontal time duration through a horizontal synchronization signal line HSYNCL. In this case, as illustrated in FIG. 3, the display controller 120 may change the data voltage VDAT for the display operation during a first time T1 of each horizontal time duration HT, the touch controller 170 may change the touch driving voltage VTX for the touch sensing operation during a second time T2 of each horizontal time duration HT which does not overlap the first time T1, and thus the interference between the data voltage VDAT for the display operation and the touch driving voltage VTX for the touch sensing operation may be reduced or prevented.

However, although the touch controller 170 receives the vertical synchronization signal VSYNC and the horizontal synchronization signal HSYNC from the display controller 120, the touch controller 170 may hardly know a driving frequency (or a frame rate), a driving mode, etc., and may hardly respond to various frame rates, various driving modes, etc. of the display device 100. In a case where a dedicated channel for providing display driving information about the frame rate, the driving mode, etc., of the display device 100 is disposed between the display controller 120 and the touch controller 170, the dedicated channel may have high redundancy because the dedicated channel is infrequently used. Further, in a case where a data channel between the external host processor and the display controller 120 is shared also by the touch controller 170, data between the external host processor and the display controller 120 and data between the display controller 120 and the touch controller 170 may conflict with each other.

To address these problems, in embodiments of the display device 100, the display controller 120 may provide the display driving information to the touch controller 170 by modulating the timing signal, or the horizontal synchronization signal HSYNC and/or the vertical synchronization signal VSYNC in a blank period of a frame period. Here, modulating the timing signal may mean changing or adjusting the timing signal in any manner.

In some embodiments, to modulate the timing signal, as illustrated in FIG. 1, the controller 150 may include a timing signal encoder 190 that modulates or encodes the timing signal. The timing signal encoder 190 may receive the internal vertical synchronization signal IVSYNC and the internal horizontal synchronization signal IHSYNC from the internal timing signal generator 180, may generate the vertical synchronization signal VSYNC and the horizontal synchronization signal HSYNC representing not only the timing of the display operation but also the display driving information by modulating or encoding the internal vertical synchronization signal IVSYNC and/or the internal horizontal synchronization signal IHSYNC in the blank period to represent the display driving information, and may provide the vertical synchronization signal VSYNC and the horizontal synchronization signal HSYNC to the touch controller 170.

In some embodiments, the timing signal encoder 190 may provide the display driving information to the touch controller 170 by modulating at least one of a pulse existence/non-existence of the timing signal in each horizontal time duration of the blank period, a pulse phase of the timing signal in the blank period, and a pulse width of the timing signal in the blank period. In an embodiment, as will be described below with reference to FIGS. 6 through 9, the timing signal encoder 190 may encode the horizontal synchronization signal HSYNC in the blank period such that whether the horizontal synchronization signal HSYNC has a pulse in each horizontal time duration of the blank period is mapped to each bit of driving information data representing the display driving information. In another embodiment, as will be described below with reference to FIGS. 10 through 13, the timing signal encoder 190 may encode the horizontal synchronization signal HSYNC in the blank period such that a phase of a pulse of the horizontal synchronization signal HSYNC from a start time point of the blank period is mapped to the driving information data representing the display driving information. In still another embodiment, as will be described below with reference to FIGS. 14 through 17, the timing signal encoder 190 may encode the vertical synchronization signal VSYNC in the blank period such that a width of a pulse of the vertical synchronization signal VSYNC in the blank period is mapped to the driving information data representing the display driving information. In still another embodiment, as will be described below with reference to FIGS. 18 through 21, the timing signal encoder 190 may encode the vertical synchronization signal VSYNC in the blank period such that a phase of a pulse of the vertical synchronization signal VSYNC from a start time point of the blank period is mapped to the driving information data representing the display driving information. However, modulating or encoding the timing signal by the timing signal encoder 190 is not limited to the examples described above.

The display driving information represented by the modulated or encoded timing signal may include at least one of frame rate information about a frame rate at which the display panel 110 is driven, scan mode information about a scan mode for the display panel 110, and driving voltage information about a driving voltage provided to the display panel 110.

In some embodiments, the display controller 120 may provide, as the display driving information, the frame rate information to the touch controller 170 by modulating the horizontal synchronization signal HSYNC and/or the vertical synchronization signal VSYNC in the blank period, and the touch controller 170 may change a timing of the touch sensing operation based on the frame rate information. In an embodiment, in a case where the touch controller 170 receives the frame rate information indicating a frame rate of about 120 Hertz (Hz), as illustrated as a diagram 210 in FIG. 4, the touch controller 170 may perform the touch sensing operation that provides the touch driving voltage VTX to the plurality of touch driving lines TXL in an active period AP of a frame period FP in which the display operation that provides the data voltage VDAT to each pixel PX is performed, for example. In this case, as illustrated in FIG. 3, in each horizontal time duration HT of the active period AP, the touch controller 170 may change the touch driving voltage VTX for the touch sensing operation during the second time T2 that does not overlap the first time T1 in which the data voltage VDAT for the display operation is changed. However, in a case where the touch controller 170 receives the frame rate information indicating a frame rate of about 60 Hz, as illustrated as a diagram 230 in FIG. 4, the touch controller 170 may perform the touch sensing operation in a blank period BP of the frame period FP in which the display operation is not performed. Accordingly, the interference between the data voltage VDAT for the display operation and the touch driving voltage VTX for the touch sensing operation may be further reduced or prevented.

In other embodiments, the display controller 120 may provide, as the display driving information, the scan mode information indicating a normal scan mode or a high speed scan mode to the touch controller 170 by modulating the horizontal synchronization signal HSYNC and/or the vertical synchronization signal VSYNC in the blank period, and the touch controller 170 may change the timing of the touch sensing operation based on the scan mode information. In an embodiment, in a case where the touch controller 170 receives the scan mode information indicating the normal scan mode in which the display operation (or a display scan operation) that provides the scan signals SS and the data voltages VDAT to the plurality of pixels PX is performed over each frame period FP (or over an active period of each frame period FP), as illustrated as a diagram 250 in FIG. 5, the touch controller 170 may perform the touch sensing operation in the frame period FP (or the active period of the frame period FP) in which the display operation (or the display scan operation) is performed, for example. However, in a case where the touch controller 170 receives the scan mode information indicating the high speed scan mode in which the display operation (or the display scan operation) that provides the scan signals SS and the data voltages VDAT to the plurality of pixels PX is performed over a first period FH (e.g., a first half) of each frame period FP, as illustrated as a diagram 270 in FIG. 5, the touch controller 170 may perform the touch sensing operation in a second period SH (e.g., a second half) of each frame period FP different from the first period FH in which the display operation (or the display scan operation) is performed. Accordingly, the interference between the data voltage VDAT for the display operation and the touch driving voltage VTX for the touch sensing operation may be further reduced or prevented.

Although FIG. 4 illustrates an embodiment where the touch controller 170 receives the frame rate information as the display driving information, and FIG. 5 illustrates an embodiment where the touch controller 170 receives the scan mode information as the display driving information, the display driving information provided to the touch controller 170 is not limited to the embodiments of FIGS. 4 and 5. In an embodiment, the display driving information may include both of the frame rate information and the scan mode information, or may include other information along with or instead of the frame rate information or the scan mode information, for example. In an embodiment, the display driving information may include the driving voltage information about driving voltages (e.g., the data voltage VDAT, the high power supply voltage ELVDD and/or the low power supply voltage ELVSS) provided to the display panel 110, and the touch controller 170 may change the timing of the touch sensing operation based on the driving voltage information, for example.

As described above, in embodiments of the display device 100, the display controller 120 may transfer the vertical synchronization signal VSYNC and the horizontal synchronization signal HSYNC representing the timing of the display operation to the touch controller 170, and may provide the display driving information to the touch controller 170 by modulating or encoding the horizontal synchronization signal HSYNC and/or the vertical synchronization signal VSYNC in the blank period. Accordingly, the display driving information may be provided to the touch controller 170 without the dedicated channel for providing the display driving information, and the interference between the display operation and the touch sensing operation may be reduced or prevented.

Figure 6:
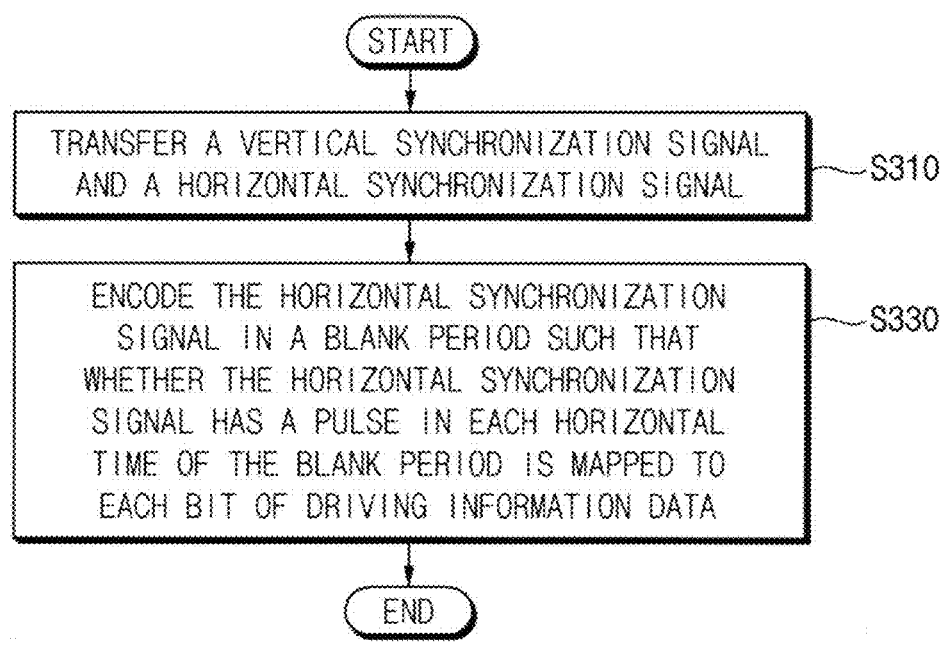
FIG. 6 is a flowchart illustrating an embodiment of a method of providing display information in a display device.
Figure 7:
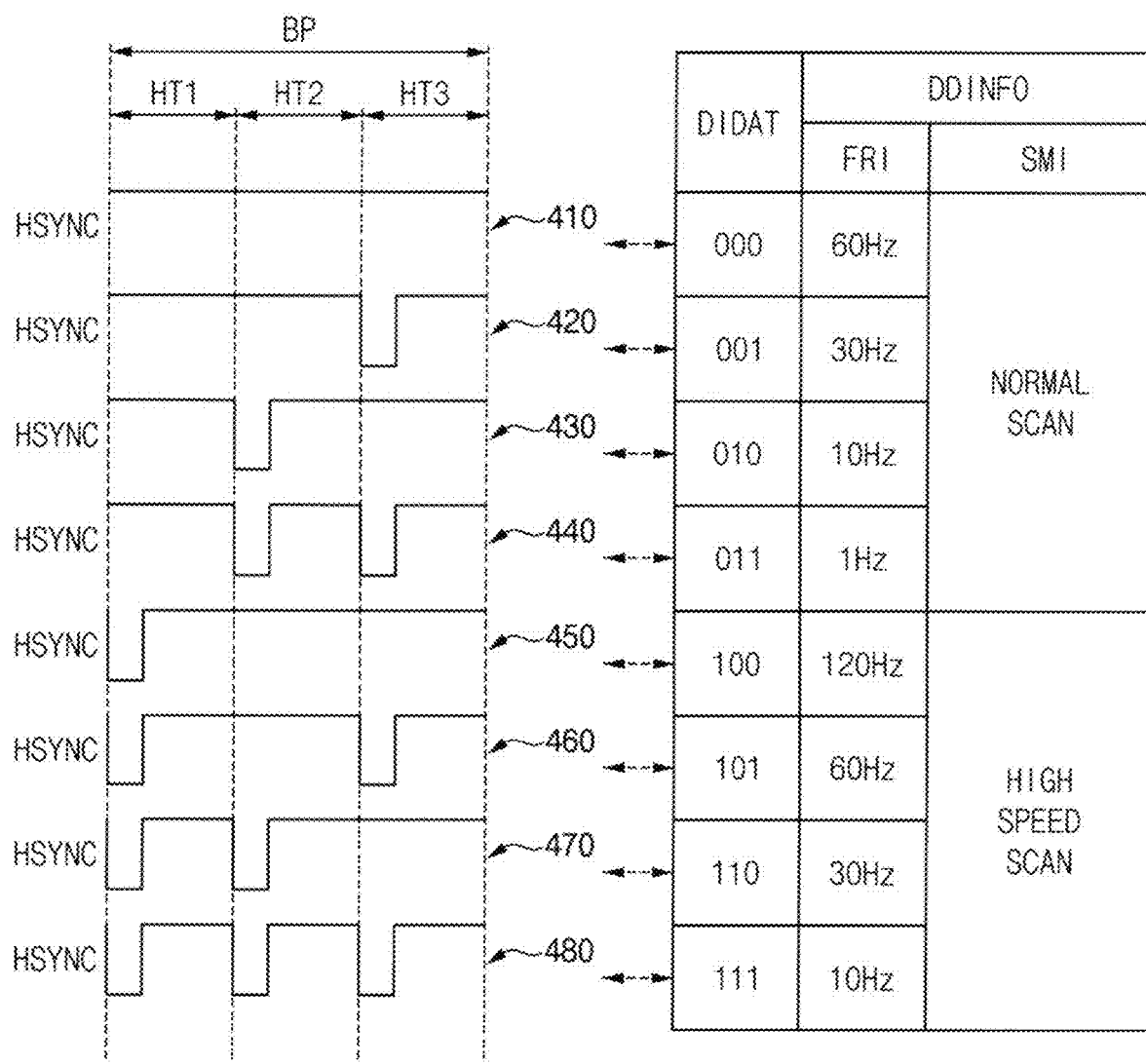
FIG. 7 is a diagram for describing an embodiment where a horizontal synchronization signal is encoded in a blank period in a method of FIG. 6.
Figure 8:
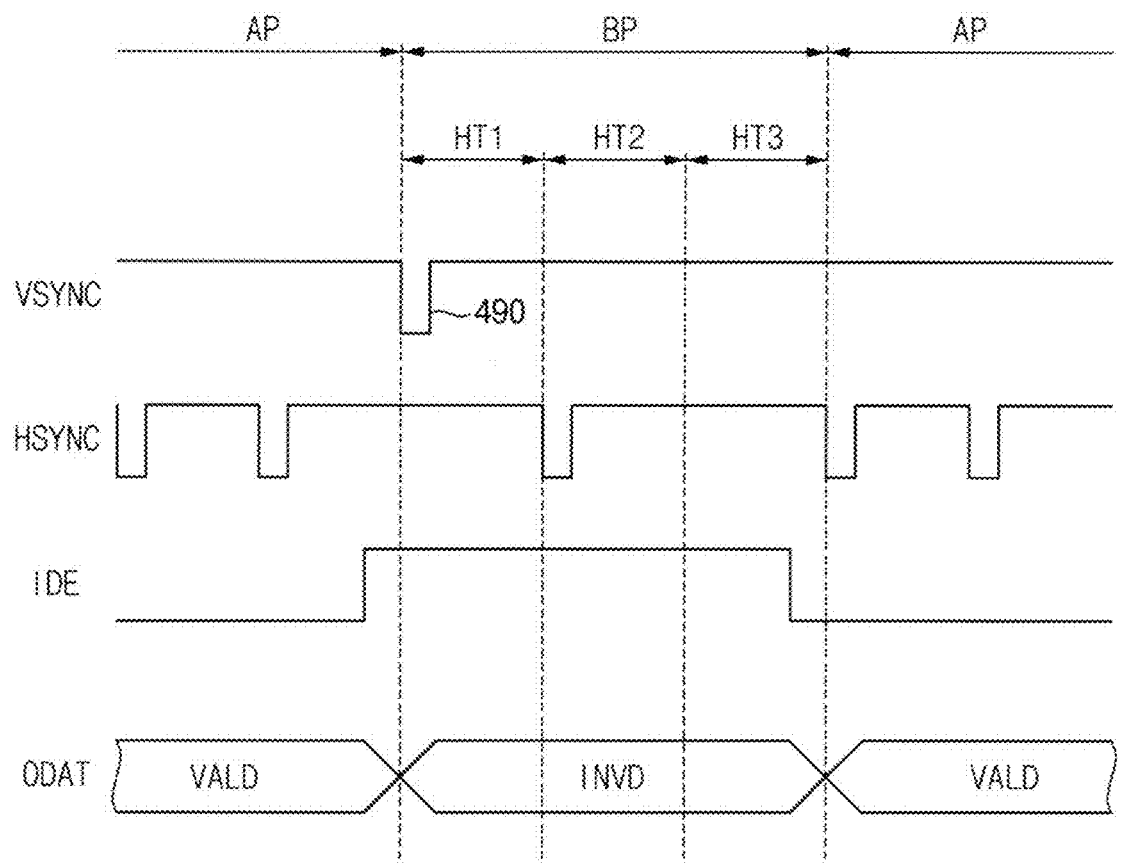
FIG. 8 is a timing diagram illustrating an embodiment of a vertical synchronization signal, a horizontal synchronization signal, an internal data enable signal and output image data in a method of FIG. 6.
Figure 9:
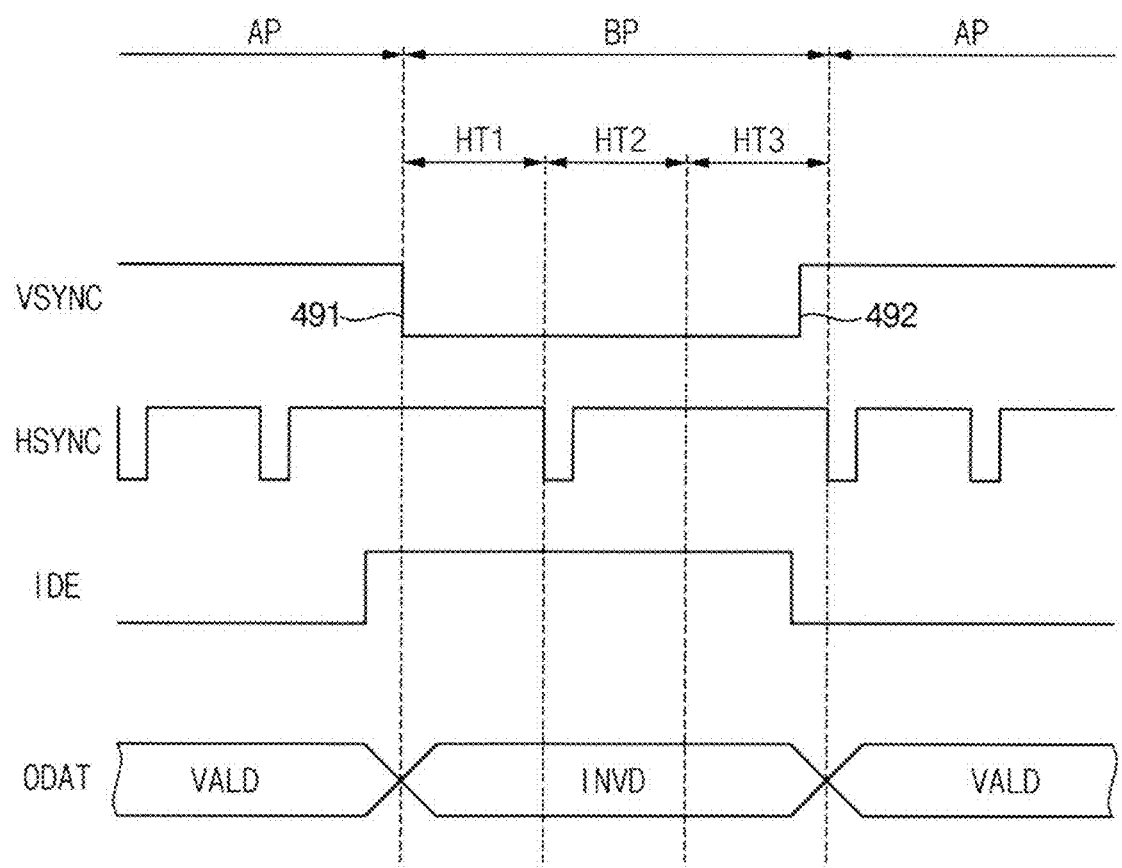
FIG. 9 is a timing diagram illustrating another embodiment of a vertical synchronization signal, a horizontal synchronization signal, an internal data enable signal and output image data in a method of FIG. 6.

FIG. 6 is a flowchart illustrating an embodiment of a method of providing display information in a display device, FIG. 7 is a diagram for describing an embodiment where a horizontal synchronization signal is encoded in a blank period in a method of FIG. 6, FIG. 8 is a timing diagram illustrating an embodiment of a vertical synchronization signal, a horizontal synchronization signal, an internal data enable signal and output image data in a method of FIG. 6, and FIG. 9 is a timing diagram illustrating another embodiment of a vertical synchronization signal, a horizontal synchronization signal, an internal data enable signal and output image data in a method of FIG. 6.

Referring to FIGS. 1 and 6, in embodiments of a display device 100, a display controller 120 may provide, as display information, not only a timing signal representing a timing of a display operation, but also display driving information about a frame rate, a driving mode, etc., of the display device 100. The display controller 120 may transfer, as the timing signal, a vertical synchronization signal VSYNC and a horizontal synchronization signal HSYNC to a touch controller 170 (S310).

The display controller 120 may transfer driving information data representing the display driving information to the touch controller 170 in a blank period by encoding the horizontal synchronization signal HSYNC in the blank period. The horizontal synchronization signal HSYNC may be encoded in the blank period such that whether the horizontal synchronization signal HSYNC has a pulse in each horizontal time duration of the blank period is mapped to each bit of the driving information data (S330).

In an embodiment, as illustrated in FIG. 7, a blank period BP may include a first horizontal time duration HT1, a second horizontal time duration HT2 and a third horizontal time duration HT3, for example. A timing signal encoder 190 of the display controller 120 may modulate or encode the horizontal synchronization signal HSYNC such that whether the horizontal synchronization signal HSYNC has a pulse in the first horizontal time duration HT1 is mapped to a first bit of the driving information data DIDAT, whether the horizontal synchronization signal HSYNC has a pulse in the second horizontal time duration HT2 is mapped to a second bit of the driving information data DIDAT, and whether the horizontal synchronization signal HSYNC has a pulse in the third horizontal time duration HT3 is mapped to a third bit of the driving information data DIDAT. The display driving information DDINFO represented by the driving information data DIDAT may include frame rate information FRI and scan mode information SMI.

In an embodiment, the horizontal synchronization signal HSYNC having no pulse in the first, second and third horizontal time durations HT1, HT2 and HT3 as illustrated in a first diagram 410 of FIG. 7 may correspond to the driving information data DIDAT of '000', and the driving information data DIDAT of '000' may represent the display driving information DDINFO including the frame rate information FRI indicating a frame rate of about 60 Hz and the scan mode information SMI indicating a normal scan mode, for example. The horizontal synchronization signal HSYNC having no pulse in the first and second horizontal time durations HT1 and HT2 and a pulse in the third horizontal time duration HT3 as illustrated in a second diagram 420 of FIG. 7 may correspond to the driving information data DIDAT of '001', and the driving information data DIDAT of '001' may represent the display driving information DDINFO including the frame rate information FRI indicating a frame rate of about 30 Hz and the scan mode information SMI indicating the normal scan mode. The horizontal synchronization signal HSYNC having no pulse in the first and third horizontal time durations HT1 and HT3 and a pulse in the second horizontal time duration HT2 as illustrated in a third diagram 430 of FIG. 7 may correspond to the driving information data DIDAT of '010', and the driving information data DIDAT of '010' may represent the display driving information DDINFO including the frame rate information FRI indicating a frame rate of about 10 Hz and the scan mode information SMI indicating the normal scan mode. The horizontal synchronization signal HSYNC having no pulse in the first horizontal time duration HT1 and pulses in the second and third horizontal time durations HT2 and HT3 as illustrated in a fourth diagram 440 of FIG. 7 may correspond to the driving information data DIDAT of '011', and the driving information data DIDAT of '011' may represent the display driving information DDINFO including the frame rate information FRI indicating a frame rate of about 1 Hz and the scan mode information SMI indicating the normal scan mode. The horizontal synchronization signal HSYNC having no pulse in the second and third horizontal time durations HT2 and HT3 and a pulse in the first horizontal time duration HT1 as illustrated in a fifth diagram 450 of FIG. 7 may correspond to the driving information data DIDAT of '100', and the driving information data DIDAT of '100' may represent the display driving information DDINFO including the frame rate information FRI indicating a frame rate of about 120 Hz and the scan mode information SMI indicating a high speed scan mode. The horizontal synchronization signal HSYNC having no pulse in the second horizontal time duration HT2 and pulses in the first and third horizontal time durations HT1 and HT3 as illustrated in a sixth diagram 460 of FIG. 7 may correspond to the driving information data DIDAT of '101', and the driving information data DIDAT of '101' may represent the display driving information DDINFO including the frame rate information FRI indicating the frame rate of about 60 Hz and the scan mode information SMI indicating the high speed scan mode. The horizontal synchronization signal HSYNC having no pulse in the third horizontal time duration HT3 and pulses in the first and second horizontal time durations HT1 and HT2 as illustrated in a seventh diagram 470 of FIG. 7 may correspond to the driving information data DIDAT of '110', and the driving information data DIDAT of '110' may represent the display driving information DDINFO including the frame rate information FRI indicating the frame rate of about 30 Hz and the scan mode information SMI indicating the high speed scan mode. The horizontal synchronization signal HSYNC having pulses in the first, second and third horizontal time durations HT1, HT2 and HT3 as illustrated in an eighth diagram 480 of FIG. 7 may correspond to the driving information data DIDAT of '111', and the driving information data DIDAT of '111' may represent the display driving information DDINFO including the frame rate information FRI indicating the frame rate of about 10 Hz and the scan mode information SMI indicating the high speed scan mode. Although FIG. 7 illustrates an embodiment of the horizontal synchronization signal HSYNC encoded in the horizontal period BP, the driving information data DIDAT and the display driving information DDINFO, the horizontal synchronization signal HSYNC, the driving information data DIDAT and the display driving information DDINFO are not limited to the embodiment of FIG. 7.

In some embodiments, to inform the touch controller 170 of a transfer start timing of the driving information data DIDAT, the display controller 120 may toggle the vertical synchronization signal VSYNC at a start time point of the blank period BP. In an embodiment, as illustrated in FIG. 8, in an active period AP, the vertical synchronization signal VSYNC may have an off level (e.g., a high level), the horizontal synchronization signal HSYNC may toggle periodically (e.g., per one horizontal time duration), an internal data enable signal IDE may have an on level (e.g., a low level), and output image data ODAT provided from a controller 150 to a data driver 130 may be valid image data VALD, for example. Further, in the blank period BP between the active periods AP, the internal data enable signal IDE may have an off level (e.g., a high level), and the output image data ODAT may be invalid image data INVD. The display controller 120 may transfer the driving information data DIDAT representing the display driving information DDINFO to the touch controller 170 in the blank period BP by encoding the horizontal synchronization signal HSYNC in the blank period BP such that whether the horizontal synchronization signal HSYNC has a pulse in each of horizontal time durations HT1, HT2 and HT3 of the blank period BP is mapped to each bit of the driving information data DIDAT. Further, the display controller 120 may inform the touch controller 170 of the transfer start timing of the driving information data DIDAT by toggling the vertical synchronization signal VSYNC at the start time point of the blank period BP, or by modulating the vertical synchronization signal VSYNC such that the vertical synchronization signal VSYNC has a pulse 490 in an initial portion of the first horizontal time duration HT1 of the blank period BP.

In other embodiments, as illustrated in FIG. 9, the display controller 120 may modulate the vertical synchronization signal VSYNC such that the vertical synchronization signal VSYNC has a first edge 491 (e.g., a falling edge) at the start time point of the blank period BP to inform the touch controller 170 of the transfer start timing of the driving information data DIDAT, and has a second edge 492 (e.g., a rising edge) at (or near) an end time point of the blank period BP to inform the touch controller 170 of a transfer end timing of the driving information data DIDAT.

As described above, in embodiments of the display device 100, the display controller 120 may transfer the vertical synchronization signal VSYNC and the horizontal synchronization signal HSYNC to the touch controller 170, and may provide the display driving information DDINFO to the touch controller 170 by modulating a pulse existence/nonexistence of the horizontal synchronization signal HSYNC in each of horizontal time durations HT1, HT2 and HT3 of the blank period BP. Accordingly, the display driving information DDINFO may be provided to the touch controller 170 without a dedicated channel for providing the display driving information DDINFO, and interference between the display operation and a touch sensing operation may be reduced or prevented.

Figure 10:
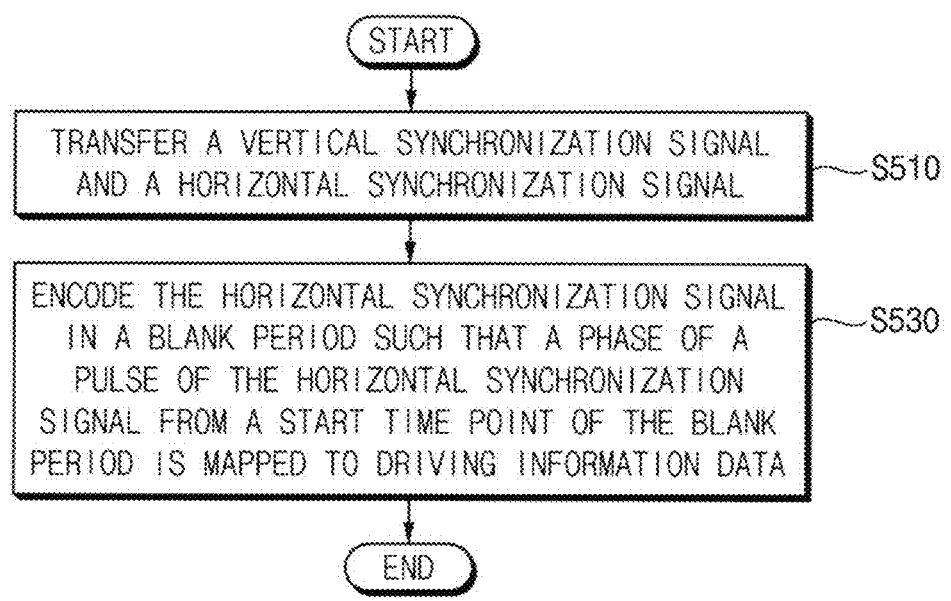
FIG. 10 is a flowchart illustrating an embodiment of a method of providing display information in a display device.
Figure 11:
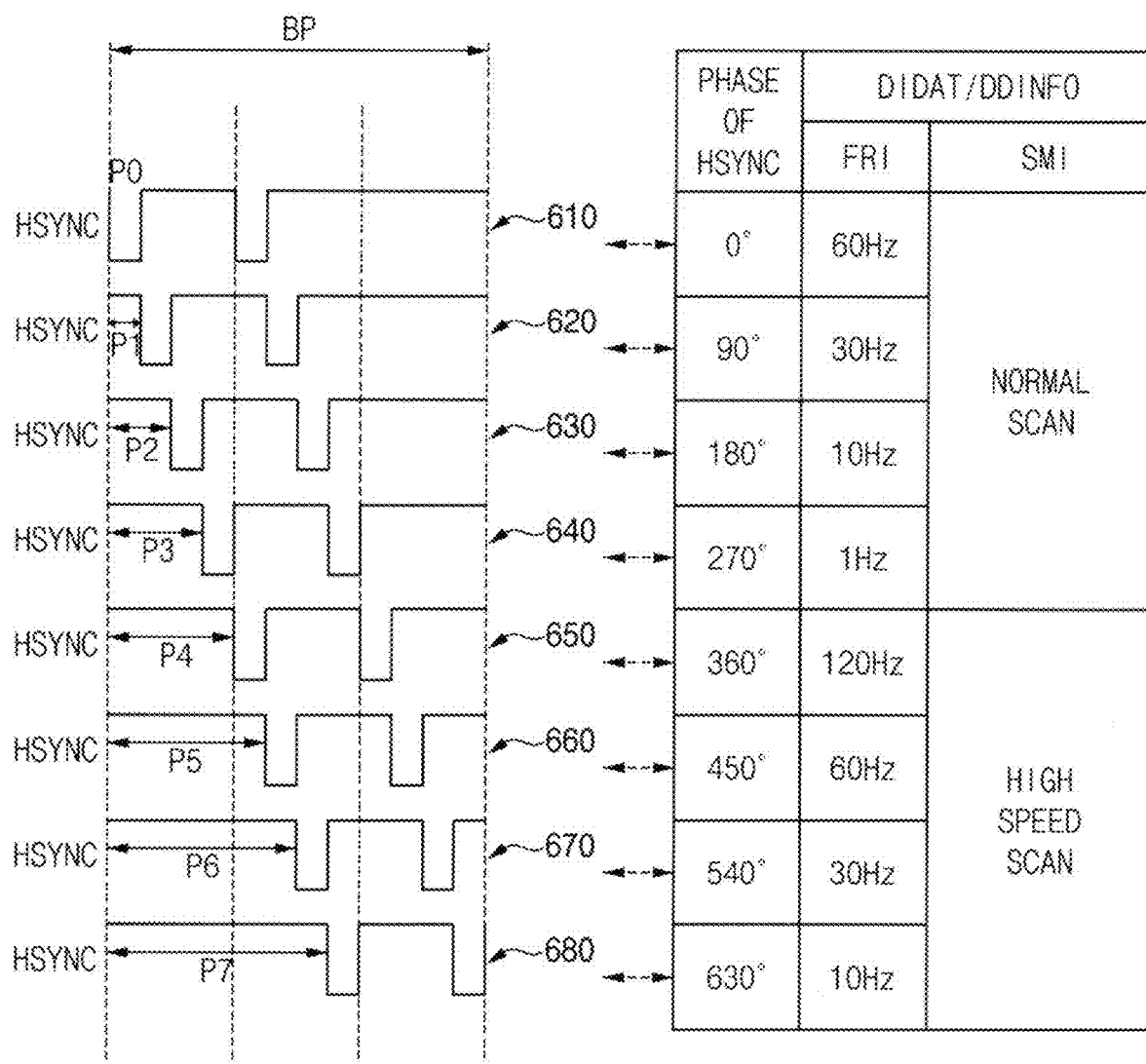
FIG. 11 is a diagram for describing an embodiment where a horizontal synchronization signal is encoded in a blank period in a method of FIG. 10.
Figure 12:
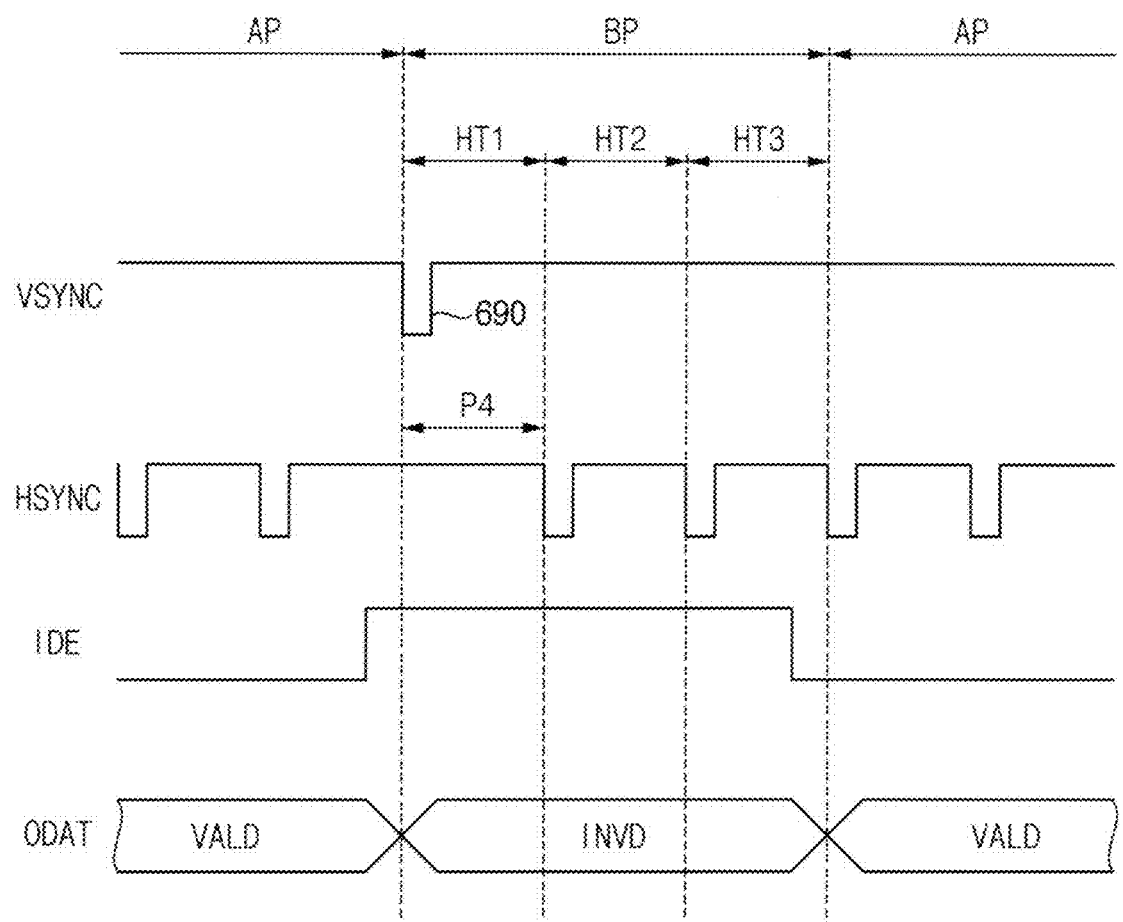
FIG. 12 is a timing diagram illustrating an embodiment of a vertical synchronization signal, a horizontal synchronization signal, an internal data enable signal and output image data in a method of FIG. 10.
Figure 13:
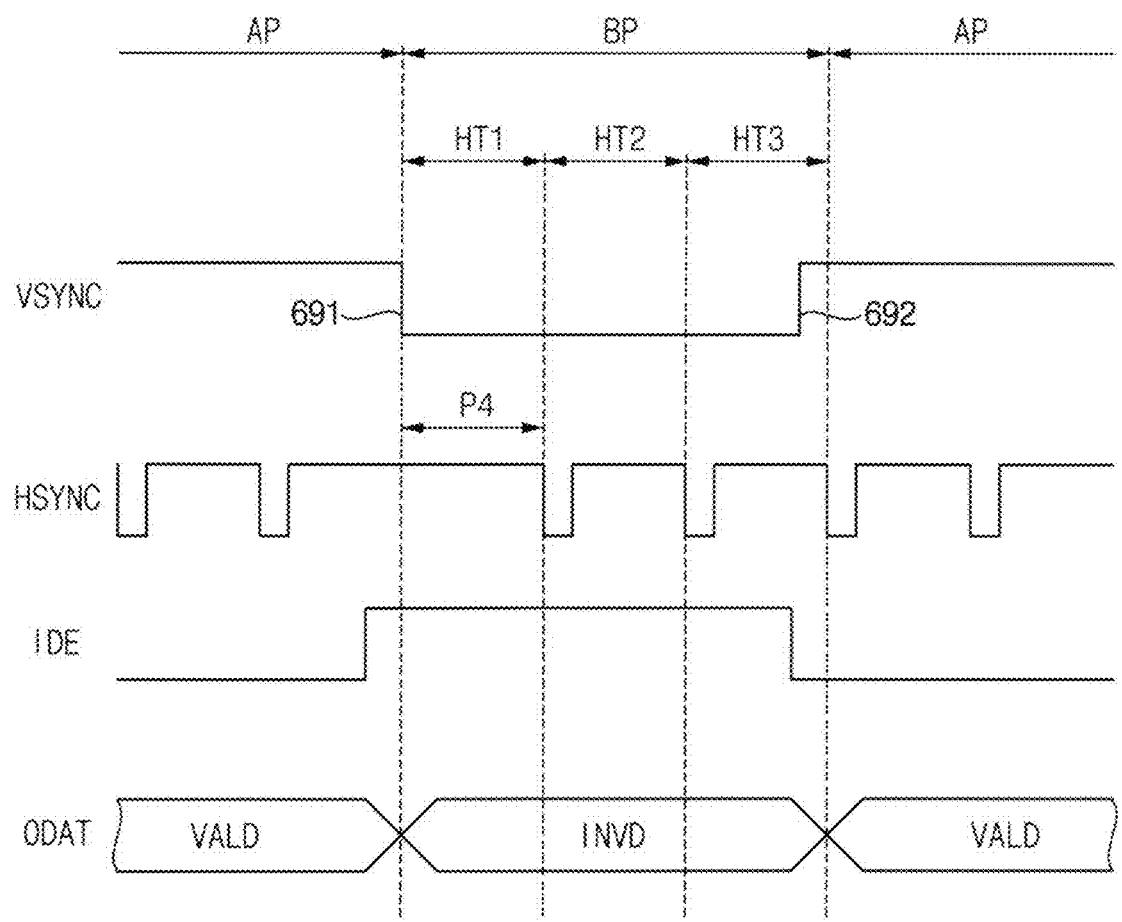
FIG. 13 is a timing diagram illustrating another embodiment of a vertical synchronization signal, a horizontal synchronization signal, an internal data enable signal and output image data in a method of FIG. 10.

FIG. 10 is a flowchart illustrating an embodiment of a method of providing display information in a display device, FIG. 11 is a diagram for describing an embodiment where a horizontal synchronization signal is encoded in a blank period in a method of FIG. 10, FIG. 12 is a timing diagram illustrating an embodiment of a vertical synchronization signal, a horizontal synchronization signal, an internal data enable signal and output image data in a method of FIG. 10, and FIG. 13 is a timing diagram illustrating another embodiment of a vertical synchronization signal, a horizontal synchronization signal, an internal data enable signal and output image data in a method of FIG. 10.

Referring to FIGS. 1 and 10, in embodiments of a display device 100, a display controller 120 may transfer a vertical synchronization signal VSYNC and a horizontal synchronization signal HSYNC to a touch controller 170 (S510), and may transfer driving information data representing display driving information to the touch controller 170 in a blank period by encoding the horizontal synchronization signal HSYNC in the blank period such that a phase of a pulse of the horizontal synchronization signal HSYNC from a start time point of the blank period is mapped to the driving information data (S530).

In an embodiment, as illustrated in FIG. 11, a timing signal encoder 190 of the display controller 120 may modulate or encode the horizontal synchronization signal HSYNC such that a time or a phase from a start time point of a blank period BP to a falling edge of a pulse of the horizontal synchronization signal HSYNC is mapped to the driving information data DIDAT, for example. Further, the display driving information DDINFO represented by the driving information data DIDAT may include frame rate information FRI and scan mode information SMI.

In an embodiment, the horizontal synchronization signal HSYNC having a pulse phase P0 of about 0 degree as illustrated in a first diagram 610 of FIG. 11 may correspond to the display driving information DDINFO including the frame rate information FRI indicating a frame rate of about 60 Hz and the scan mode information SMI indicating a normal scan mode, for example. The horizontal synchronization signal HSYNC having a pulse phase P1 of about 90 degrees as illustrated in a second diagram 620 of FIG. 11 may correspond to the display driving information DDINFO including the frame rate information FRI indicating a frame rate of about 30 Hz and the scan mode information SMI indicating the normal scan mode. The horizontal synchronization signal HSYNC having a pulse phase P2 of about 180 degrees as illustrated in a third diagram 630 of FIG. 11 may correspond to the display driving information DDINFO including the frame rate information FRI indicating a frame rate of about 10 Hz and the scan mode information SMI indicating the normal scan mode. The horizontal synchronization signal HSYNC having a pulse phase P3 of about 270 degrees as illustrated in a fourth diagram 640 of FIG. 11 may correspond to the display driving information DDINFO including the frame rate information FRI indicating a frame rate of about 1 Hz and the scan mode information SMI indicating the normal scan mode. The horizontal synchronization signal HSYNC having a pulse phase P4 of about 360 degrees as illustrated in a fifth diagram 650 of FIG. 11 may correspond to the display driving information DDINFO including the frame rate information FRI indicating a frame rate of about 120 Hz and the scan mode information SMI indicating a high speed scan mode. The horizontal synchronization signal HSYNC having a pulse phase P5 of about 450 degrees as illustrated in a sixth diagram 660 of FIG. 11 may correspond to the display driving information DDINFO including the frame rate information FRI indicating the frame rate of about 60 Hz and the scan mode information SMI indicating the high speed scan mode. The horizontal synchronization signal HSYNC having a pulse phase P6 of about 540 degrees as illustrated in a seventh diagram 670 of FIG. 11 may correspond to the display driving information DDINFO including the frame rate information FRI indicating the frame rate of about 30 Hz and the scan mode information SMI indicating the high speed scan mode. The horizontal synchronization signal HSYNC having a pulse phase P7 of about 630 degrees as illustrated in an eighth diagram 680 of FIG. 11 may correspond to the display driving information DDINFO including the frame rate information FRI indicating the frame rate of about 10 Hz and the scan mode information SMI indicating the high speed scan mode. Although FIG. 11 illustrates an embodiment of a pulse phase of the horizontal synchronization signal HSYNC, the driving information data DIDAT and the display driving information DDINFO, the pulse phase of the horizontal synchronization signal HSYNC, the driving information data DIDAT and the display driving information DDINFO are not limited to the embodiment of FIG. 11.

In some embodiments, as illustrated in FIG. 12, to inform the touch controller 170 of a transfer start timing of the driving information data DIDAT, the display controller 120 may modulate the vertical synchronization signal VSYNC such that the vertical synchronization signal VSYNC has a pulse 690 at a start time point of the blank period BP. In other embodiments, as illustrated in FIG. 13, the display controller 120 may modulate the vertical synchronization signal VSYNC such that the vertical synchronization signal VSYNC has a first edge 691 (e.g., a falling edge) at the start time point of the blank period BP to inform the touch controller 170 of the transfer start timing of the driving information data DIDAT, and has a second edge 692 (e.g., a rising edge) at (or near) an end time point of the blank period BP to inform the touch controller 170 of a transfer end timing of the driving information data DIDAT.

As described above, in embodiments of the display device 100, the display controller 120 may transfer the vertical synchronization signal VSYNC and the horizontal synchronization signal HSYNC to the touch controller 170, and may provide the display driving information DDINFO to the touch controller 170 by modulating a pulse phase of the horizontal synchronization signal HSYNC in the blank period BP. Accordingly, the display driving information DDINFO may be provided to the touch controller 170 without a dedicated channel for providing the display driving information DDINFO, and interference between a display operation and a touch sensing operation may be reduced or prevented.

Figure 14:
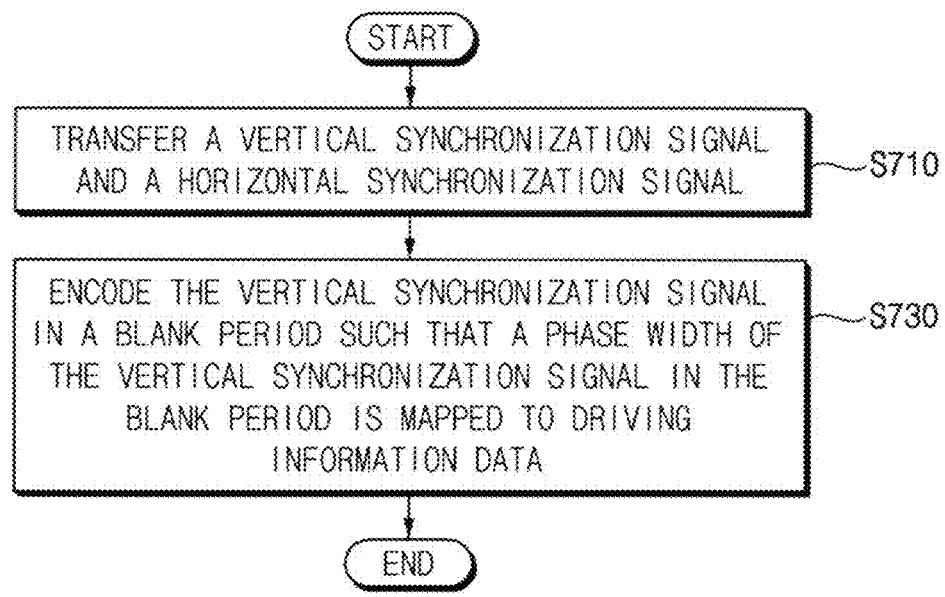
FIG. 14 is a flowchart illustrating an embodiment of a method of providing display information in a display device.
Figure 15:
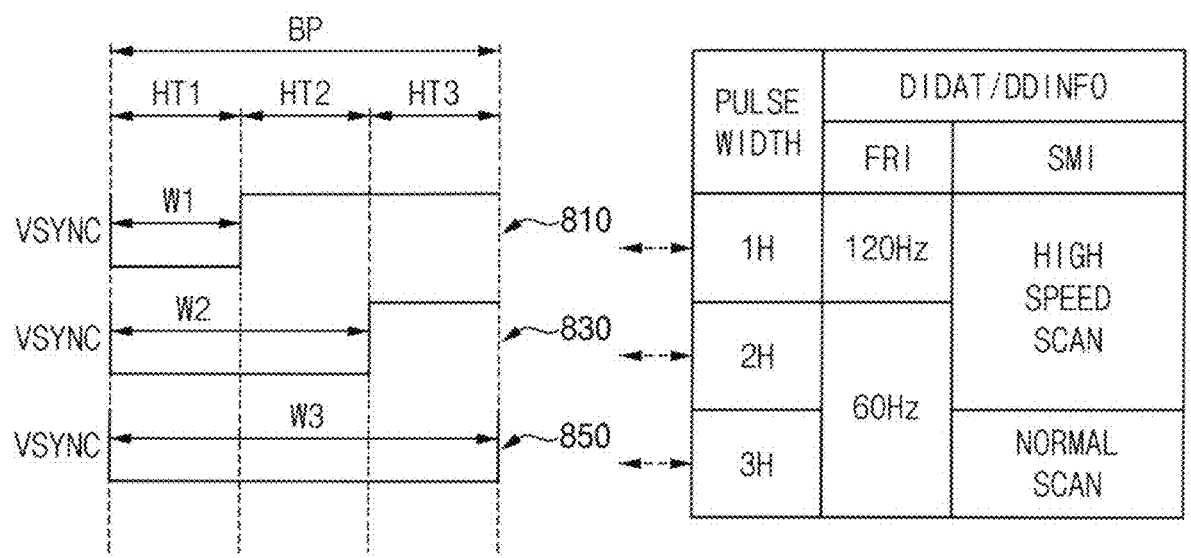
FIG. 15 is a diagram for describing an embodiment where a vertical synchronization signal is encoded in a blank period in a method of FIG. 14.
Figure 16:
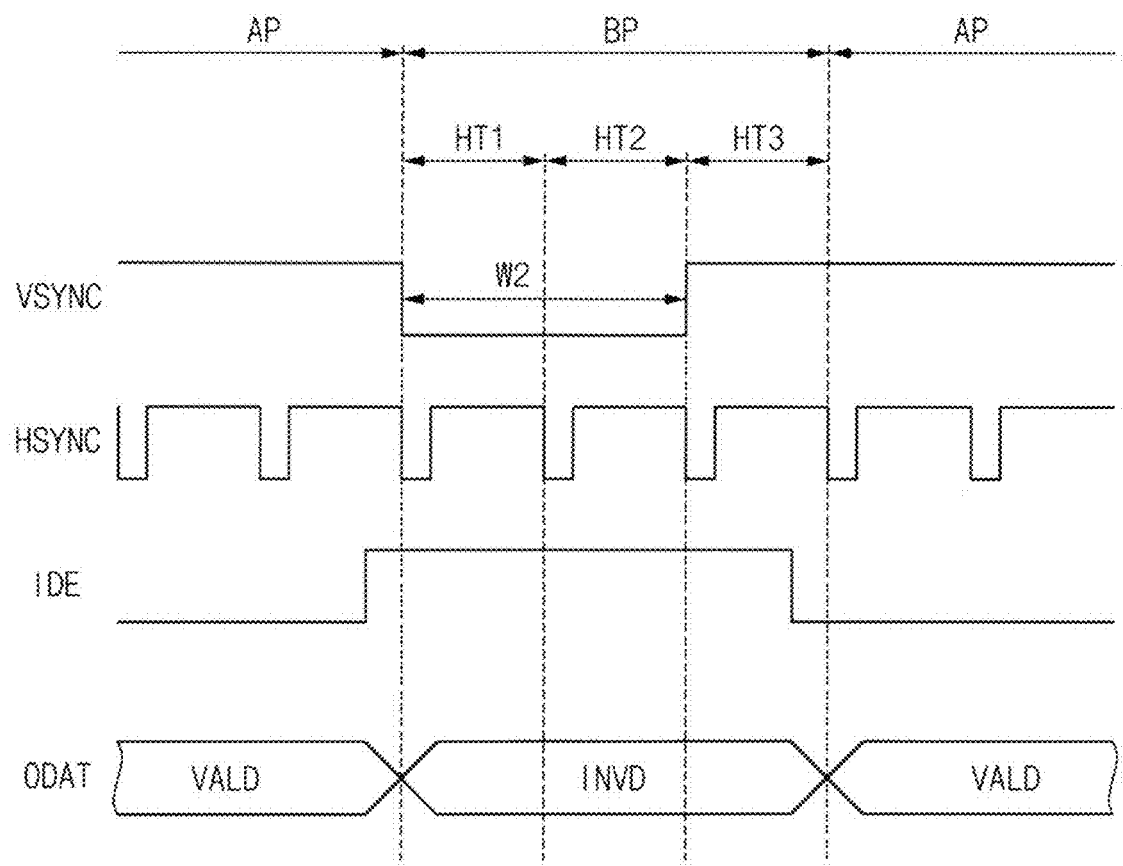
FIG. 16 is a timing diagram illustrating an embodiment of a vertical synchronization signal, a horizontal synchronization signal, an internal data enable signal and output image data in a method of FIG. 14.
Figure 17:
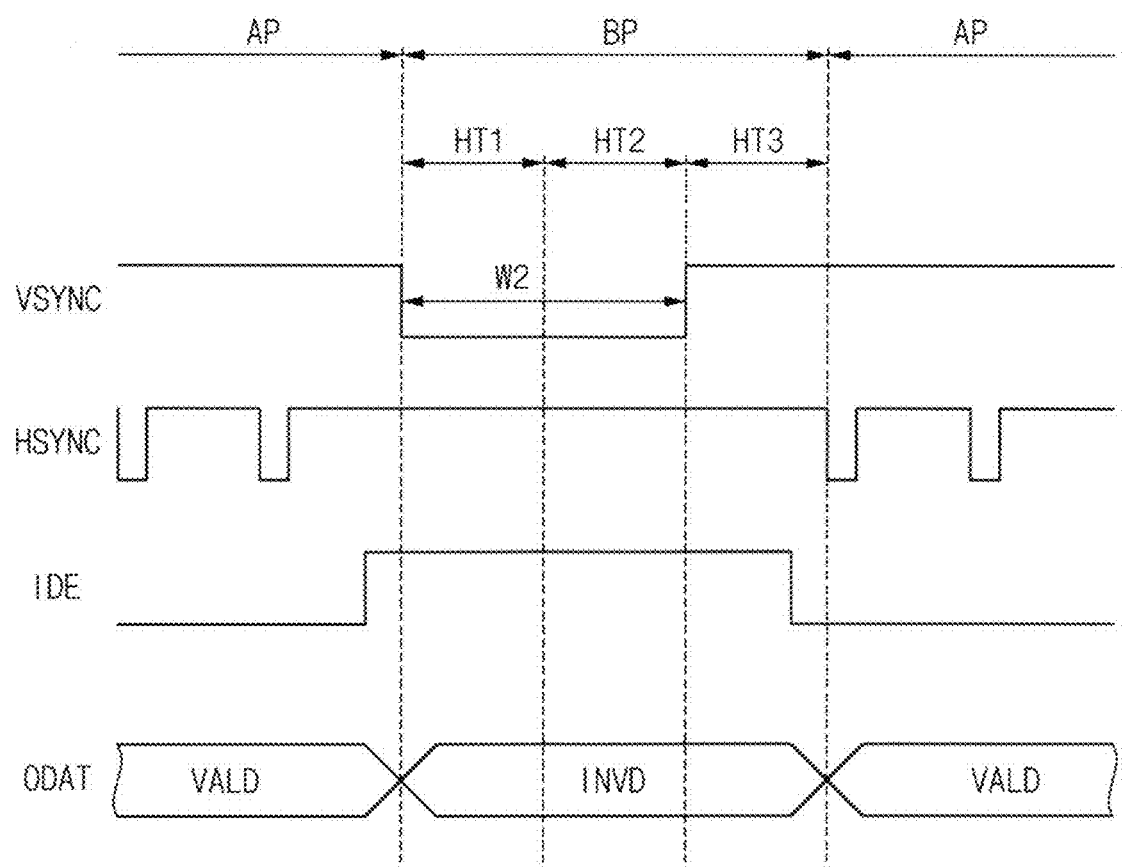
FIG. 17 is a timing diagram illustrating another embodiment of a vertical synchronization signal, a horizontal synchronization signal, an internal data enable signal and output image data in a method of FIG. 14.

FIG. 14 is a flowchart illustrating an embodiment of a method of providing display information in a display device, FIG. 15 is a diagram for describing an embodiment where a vertical synchronization signal is encoded in a blank period in a method of FIG. 14, FIG. 16 is a timing diagram illustrating an embodiment of a vertical synchronization signal, a horizontal synchronization signal, an internal data enable signal and output image data in a method of FIG. 14, and FIG. 17 is a timing diagram illustrating another embodiment of a vertical synchronization signal, a horizontal synchronization signal, an internal data enable signal and output image data in a method of FIG. 14.

Referring to FIGS. 1 and 14, in embodiments of a display device 100, a display controller 120 may transfer a vertical synchronization signal VSYNC and a horizontal synchronization signal HSYNC to a touch controller 170 (S710), and may transfer driving information data representing display driving information to the touch controller 170 in a blank period by encoding the vertical synchronization signal VSYNC in the blank period such that a width of a pulse of the vertical synchronization signal VSYNC in the blank period is mapped to the driving information data (S730).

In an embodiment, as illustrated in FIG. 15, a timing signal encoder 190 of the display controller 120 may modulate or encode the vertical synchronization signal VSYNC such that a pulse width W1, W2 and W3 of the vertical synchronization signal VSYNC in a blank period BP is mapped to the driving information data DIDAT, for example. Further, the display driving information DDINFO represented by the driving information data DIDAT may include frame rate information FRI and scan mode information SMI.

In an embodiment, the vertical synchronization signal VSYNC having a pulse width W1 corresponding to a first horizontal time duration HT1, or a pulse width W1 corresponding to one horizontal time duration (or 1H time duration) as illustrated in a first diagram 810 of FIG. 15 may correspond to the display driving information DDINFO including the frame rate information FRI indicating a frame rate of about 120 Hz and the scan mode information SMI indicating a high speed scan mode, for example. The vertical synchronization signal VSYNC having a pulse width W2 corresponding to first and second horizontal time durations HT1 and HT2, or a pulse width W2 corresponding to two horizontal time durations (or 2H time duration) as illustrated in a second diagram 830 of FIG. 15 may correspond to the display driving information DDINFO including the frame rate information FRI indicating a frame rate of about 60 Hz and the scan mode information SMI indicating the high speed scan mode. The vertical synchronization signal VSYNC having a pulse width W3 corresponding to first, second and third horizontal time durations HT1, HT2 and HT3, or a pulse width W3 corresponding to three horizontal time durations (or 3H time duration) as illustrated in a third diagram 850 of FIG. 15 may correspond to the display driving information DDINFO including the frame rate information FRI indicating the frame rate of about 60 Hz and the scan mode information SMI indicating a normal scan mode. Although FIG. 15 illustrates an embodiment of a pulse width of the vertical synchronization signal VSYNC, the driving information data DIDAT and the display driving information DDINFO, the pulse width of the vertical synchronization signal VSYNC, the driving information data DIDAT and the display driving information DDINFO are not limited to the embodiment of FIG. 15.

In some embodiments, as illustrated in FIG. 16, the display controller 120 may toggle the horizontal synchronization signal HSYNC periodically (e.g., per each of horizontal time durations HT1, HT2 and HT3) in the blank period BP. In other embodiments, as illustrated in FIG. 17, unlike the horizontal synchronization signal HSYNC periodically toggling in an active period AP, the display controller 120 may maintain the horizontal synchronization signal HSYNC at a constant level (e.g., an off level or a high level) in the blank period BP to inform the touch controller 170 of a transfer timing of the driving information data DIDAT.

As described above, in embodiments of the display device 100, the display controller 120 may transfer the vertical synchronization signal VSYNC and the horizontal synchronization signal HSYNC to the touch controller 170, and may provide the display driving information DDINFO to the touch controller 170 by modulating a pulse width of the vertical synchronization signal VSYNC in the blank period BP. Accordingly, the display driving information DDINFO may be provided to the touch controller 170 without a dedicated channel for providing the display driving information DDINFO, and interference between a display operation and a touch sensing operation may be reduced or prevented.

Figure 18:
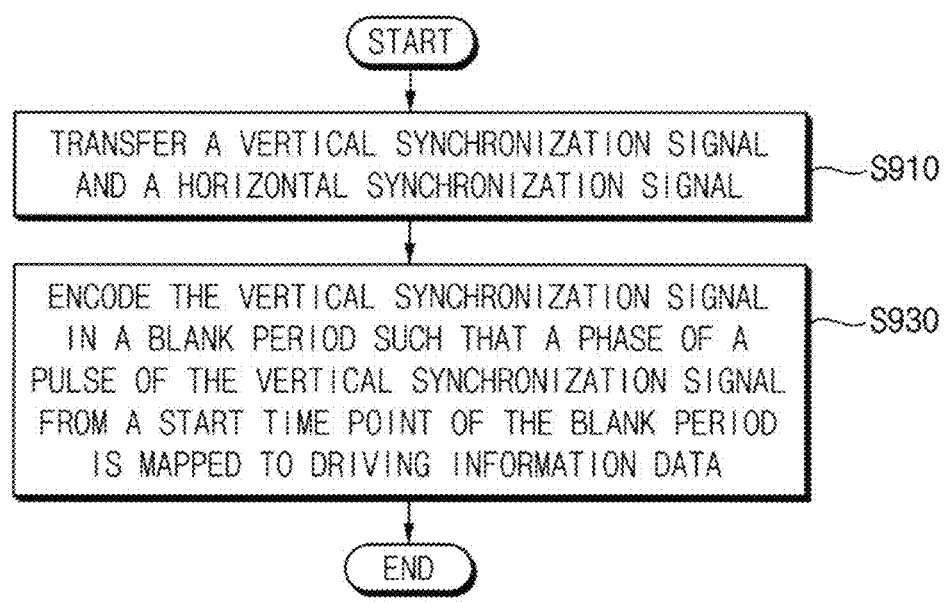
FIG. 18 is a flowchart illustrating an embodiment of a method of providing display information in a display device.
Figure 19:
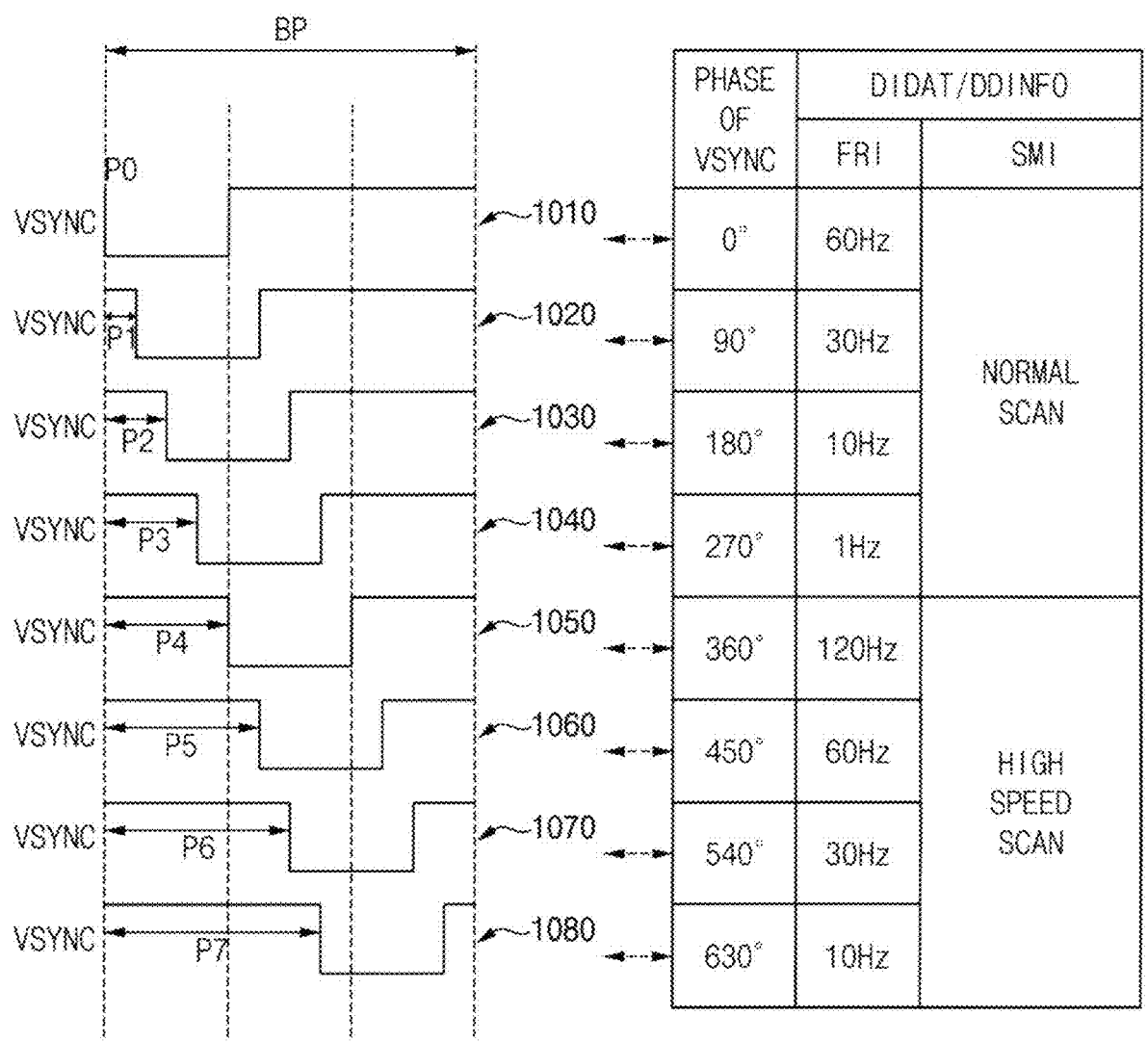
FIG. 19 is a diagram for describing an embodiment where a vertical synchronization signal is encoded in a blank period in a method of FIG. 18.
Figure 20:
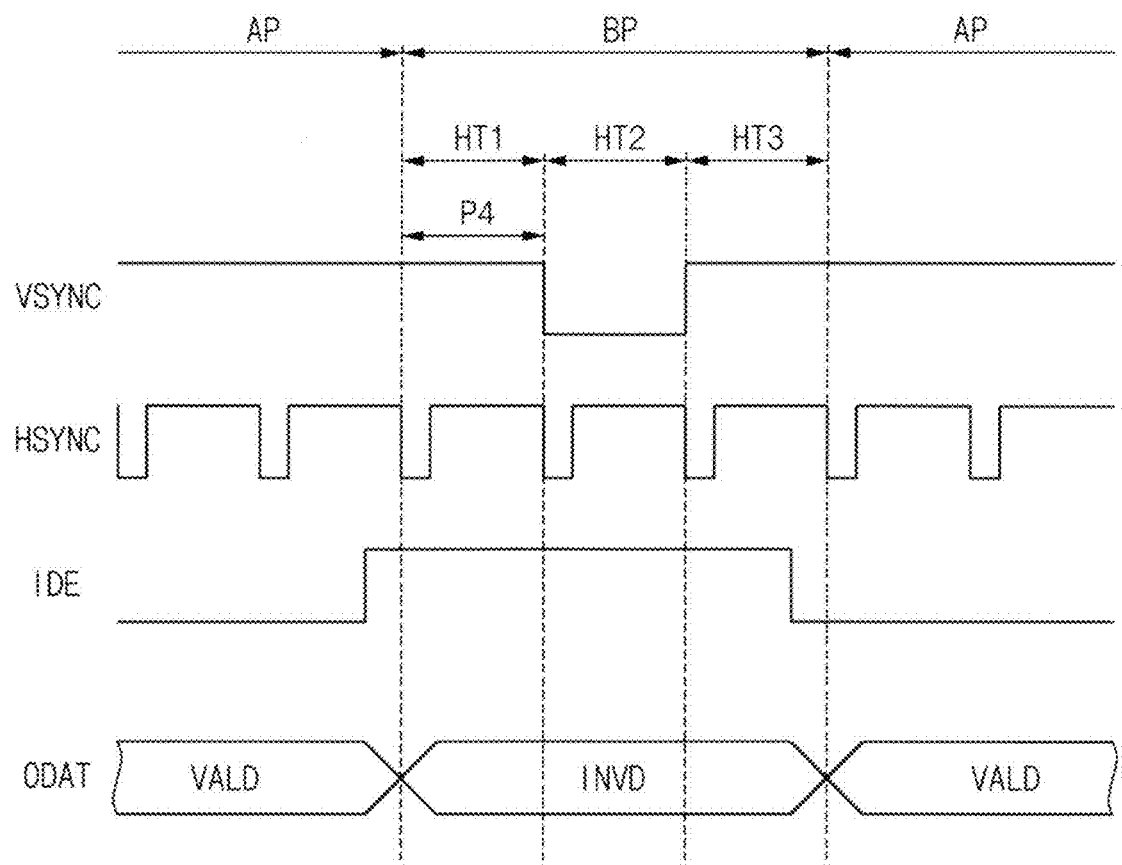
FIG. 20 is a timing diagram illustrating an embodiment of a vertical synchronization signal, a horizontal synchronization signal, an internal data enable signal and output image data in a method of FIG. 18.
Figure 21:
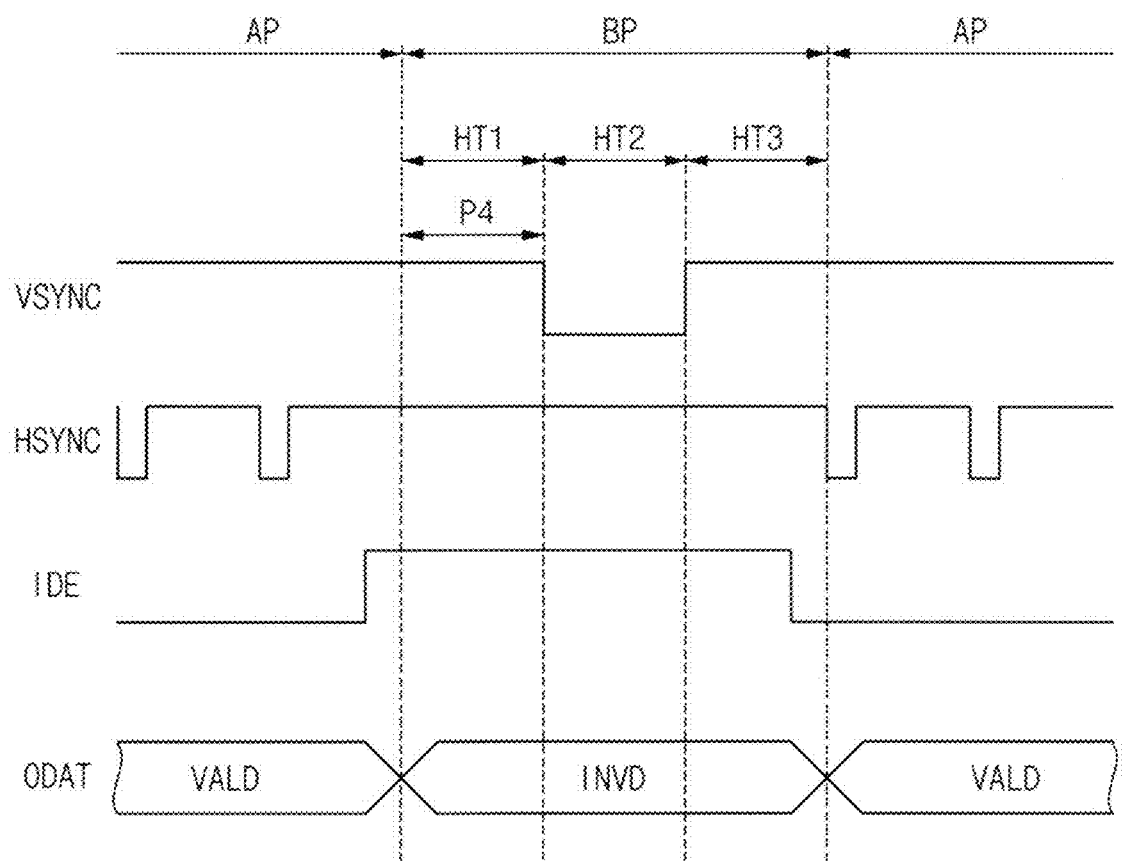
FIG. 21 is a timing diagram illustrating another embodiment of a vertical synchronization signal, a horizontal synchronization signal, an internal data enable signal and output image data in a method of FIG. 18.

FIG. 18 is a flowchart illustrating an embodiment of a method of providing display information in a display device, FIG. 19 is a diagram for describing an embodiment where a vertical synchronization signal is encoded in a blank period in a method of FIG. 18, FIG. 20 is a timing diagram illustrating an embodiment of a vertical synchronization signal, a horizontal synchronization signal, an internal data enable signal and output image data in a method of FIG. 18, and FIG. 21 is a timing diagram illustrating another embodiment of a vertical synchronization signal, a horizontal synchronization signal, an internal data enable signal and output image data in a method of FIG. 18.

Referring to FIGS. 1 and 18, in embodiments of a display device 100, a display controller 120 may transfer a vertical synchronization signal VSYNC and a horizontal synchronization signal HSYNC to a touch controller 170 (S910), and may transfer driving information data representing display driving information to the touch controller 170 in a blank period by encoding the vertical synchronization signal VSYNC in the blank period such that a phase of a pulse of the vertical synchronization signal VSYNC from a start time point of the blank period is mapped to the driving information data (S930).

In an embodiment, as illustrated in FIG. 19, a timing signal encoder 190 of the display controller 120 may modulate or encode the vertical synchronization signal VSYNC such that a time or a phase from a start time point of a blank period BP to a falling edge of a pulse of the vertical synchronization signal VSYNC is mapped to the driving information data DIDAT, for example. Further, the display driving information DDINFO represented by the driving information data DIDAT may include frame rate information FRI and scan mode information SMI.

In an embodiment, the vertical synchronization signal VSYNC having a pulse phase P0 of about 0 degree as illustrated in a first diagram 1010 of FIG. 19 may correspond to the display driving information DDINFO including the frame rate information FRI indicating a frame rate of about 60 Hz and the scan mode information SMI indicating a normal scan mode, for example. The vertical synchronization signal VSYNC having a pulse phase P1 of about 90 degrees as illustrated in a second diagram 1020 of FIG. 19 may correspond to the display driving information DDINFO including the frame rate information FRI indicating a frame rate of about 30 Hz and the scan mode information SMI indicating the normal scan mode. The vertical synchronization signal VSYNC having a pulse phase P2 of about 180 degrees as illustrated in a third diagram 1030 of FIG. 19 may correspond to the display driving information DDINFO including the frame rate information FRI indicating a frame rate of about 10 Hz and the scan mode information SMI indicating the normal scan mode. The vertical synchronization signal VSYNC having a pulse phase P3 of about 270 degrees as illustrated in a fourth diagram 1040 of FIG. 19 may correspond to the display driving information DDINFO including the frame rate information FRI indicating a frame rate of about 1 Hz and the scan mode information SMI indicating the normal scan mode. The vertical synchronization signal VSYNC having a pulse phase P4 of about 360 degrees as illustrated in a fifth diagram 1050 of FIG. 19 may correspond to the display driving information DDINFO including the frame rate information FRI indicating a frame rate of about 120 Hz and the scan mode information SMI indicating a high speed scan mode. The vertical synchronization signal VSYNC having a pulse phase P5 of about 450 degrees as illustrated in a sixth diagram 1060 of FIG. 19 may correspond to the display driving information DDINFO including the frame rate information FRI indicating the frame rate of about 60 Hz and the scan mode information SMI indicating the high speed scan mode. The vertical synchronization signal VSYNC having a pulse phase P6 of about 540 degrees as illustrated in a seventh diagram 1070 of FIG. 19 may correspond to the display driving information DDINFO including the frame rate information FRI indicating the frame rate of about 30 Hz and the scan mode information SMI indicating the high speed scan mode. The vertical synchronization signal VSYNC having a pulse phase P7 of about 630 degrees as illustrated in an eighth diagram 1080 of FIG. 19 may correspond to the display driving information DDINFO including the frame rate information FRI indicating the frame rate of about 10 Hz and the scan mode information SMI indicating the high speed scan mode. Although FIG. 19 illustrates an embodiment of a pulse phase of the vertical synchronization signal VSYNC, the driving information data DIDAT and the display driving information DDINFO, the pulse phase of the vertical synchronization signal VSYNC, the driving information data DIDAT and the display driving information DDINFO are not limited to the embodiment of FIG. 19.

In some embodiments, as illustrated in FIG. 20, the display controller 120 may toggle the horizontal synchronization signal HSYNC periodically (e.g., per each of horizontal time durations HT1, HT2 and HT3) in the blank period BP. In other embodiments, as illustrated in FIG. 21, unlike the horizontal synchronization signal HSYNC periodically toggling in an active period AP, the display controller 120 may maintain the horizontal synchronization signal HSYNC at a constant level (e.g., an off level or a high level) in the blank period BP to inform the touch controller 170 of a transfer timing of the driving information data DIDAT.

As described above, in embodiments of the display device 100, the display controller 120 may transfer the vertical synchronization signal VSYNC and the horizontal synchronization signal HSYNC to the touch controller 170, and may provide the display driving information DDINFO to the touch controller 170 by modulating a pulse phase of the vertical synchronization signal VSYNC in the blank period BP. Accordingly, the display driving information DDINFO may be provided to the touch controller 170 without a dedicated channel for providing the display driving information DDINFO, and interference between a display operation and a touch sensing operation may be reduced or prevented.

Figure 22:
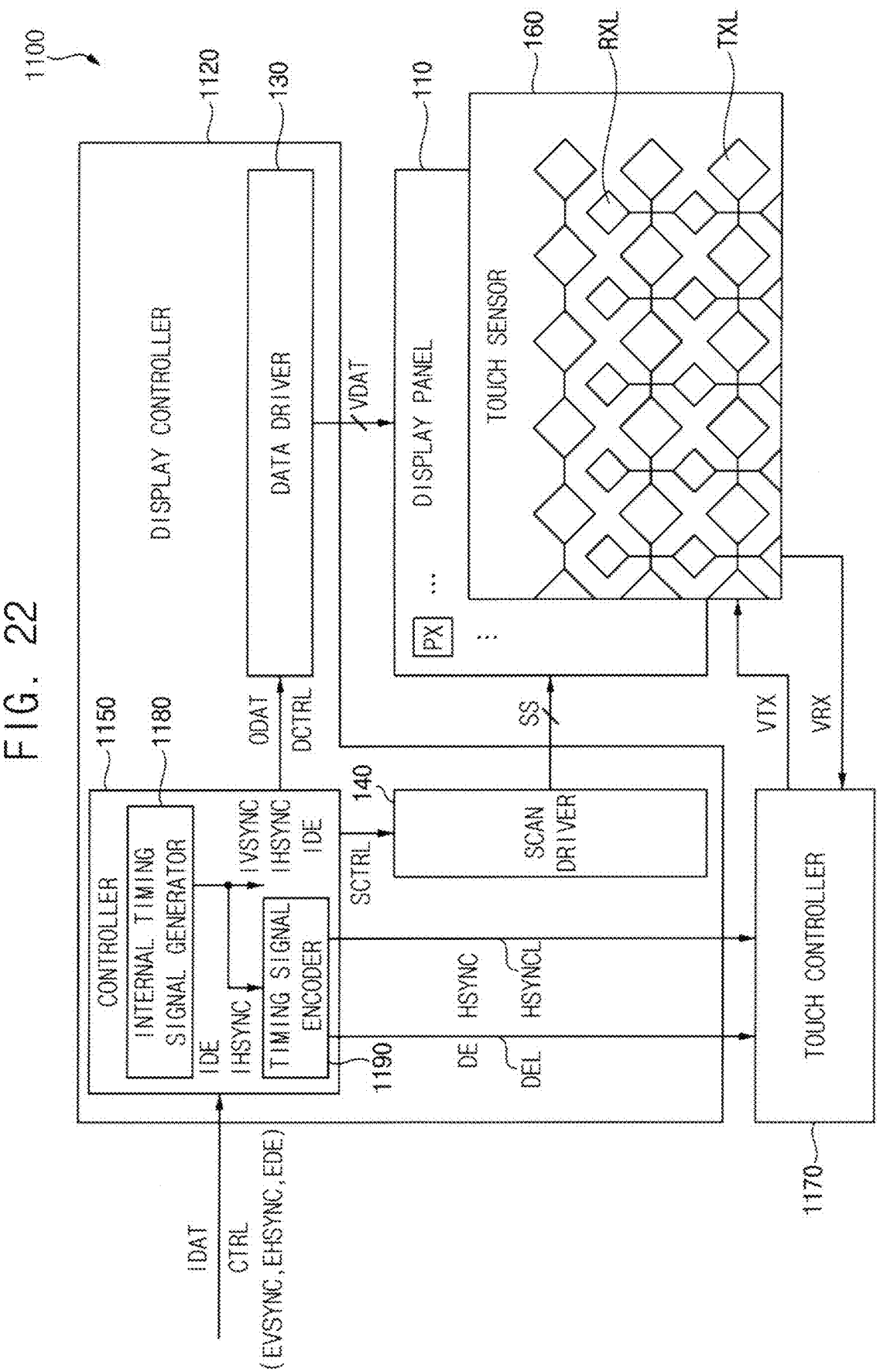
FIG. 22 is a block diagram illustrating another embodiment of a display device.

FIG. 22 is a block diagram illustrating an embodiment of a display device.

Referring to FIG. 22, a display device 1100 in embodiments may include a display panel 110, a display controller 1120, a touch sensor 160 and a touch controller 1170. In some embodiments, the display controller 1120 may include a data driver 130, a scan driver 140 and a controller 1150. The controller 1150 may include an internal timing signal generator 1180 and a timing signal encoder 1190. The display device 1100 of FIG. 22 may have a similar configuration and a similar operation to a display device 100 of FIG. 1, except that the display controller 1120 may transfer a data enable signal DE representing a timing of valid image data instead of a vertical synchronization signal VSYNC.

The timing signal encoder 1190 may receive an internal data enable signal IDE and an internal horizontal synchronization signal IHSYNC from the internal timing signal generator 1180, may generate the data enable signal DE and a horizontal synchronization signal HSYNC representing not only a timing of a display operation but also display driving information by modulating or encoding the internal data enable signal IDE and/or the internal horizontal synchronization signal IHSYNC in a blank period to represent the display driving information, may transfer the data enable signal DE through a data enable signal line DEL, and may transfer the horizontal synchronization signal HSYNC through a horizontal synchronization signal line HSYNCL.

In some embodiments, the timing signal encoder 1190 may provide the display driving information to the touch controller 1170 by modulating at least one of a pulse existence/non-existence of the data enable signal DE (and/or the horizontal synchronization signal HSYNC) in each horizontal time duration of the blank period, a pulse phase of the data enable signal DE (and/or the horizontal synchronization signal HSYNC) in the blank period, and a pulse width of the data enable signal DE (and/or the horizontal synchronization signal HSYNC) in the blank period.

Figure 23:
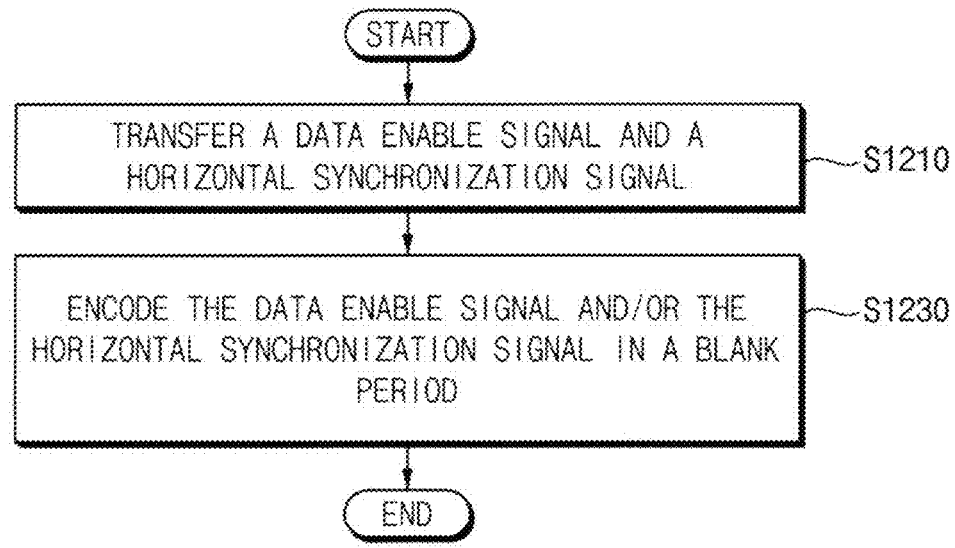
FIG. 23 is a flowchart illustrating another embodiment of a method of providing display information in a display device.

FIG. 23 is a flowchart illustrating an embodiment of a method of providing display information in a display device.

Referring to FIGS. 22 and 23, in embodiments of a display device 1100, a display controller 1120 may transfer a data enable signal DE and a horizontal synchronization signal HSYNC to a touch controller 1170 (S1210), and may provide display driving information to the touch controller 1170 in each blank period by modulating or encoding the data enable signal DE and/or the horizontal synchronization signal HSYNC in the blank period (S1230). In some embodiments, the display controller 1120 may provide the display driving information to the touch controller 1170 by modulating at least one of a pulse existence/non-existence of the data enable signal DE and/or the horizontal synchronization signal HSYNC in each horizontal time duration of the blank period, a pulse phase of the data enable signal DE and/or the horizontal synchronization signal HSYNC in the blank period, and a pulse width of the data enable signal DE and/or the horizontal synchronization signal HSYNC in the blank period.

As described above, in embodiments of the display device 1100, the display controller 1120 may transfer the data enable signal DE and the horizontal synchronization signal HSYNC to the touch controller 1170, and may provide the display driving information to the touch controller 1170 by modulating the data enable signal DE and/or the horizontal synchronization signal HSYNC in the blank period. Accordingly, the display driving information may be provided to the touch controller 1170 without a dedicated channel for providing the display driving information, and interference between a display operation and a touch sensing operation may be reduced or prevented.

Figure 24:
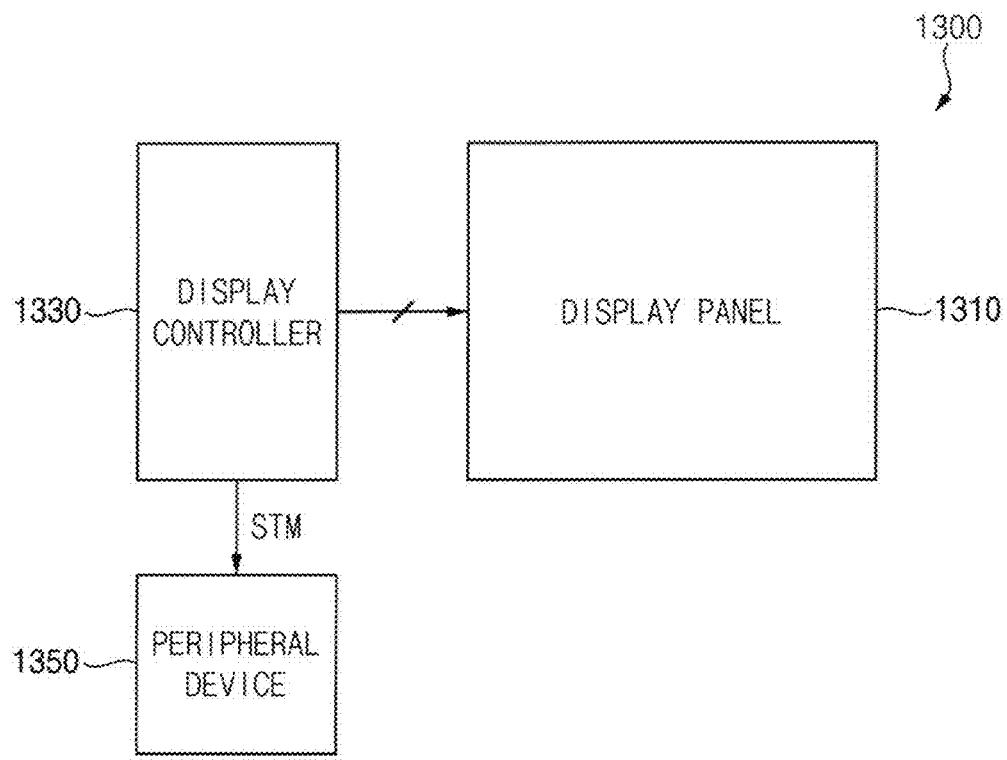
FIG. 24 is a block diagram illustrating another embodiment of a display device.

FIG. 24 is a block diagram illustrating an embodiment of a display device.

Referring to FIG. 24, a display device 1300 in embodiments may include a display panel 1310, a display controller 1330 and a peripheral device 1350. The display device 1300 of FIG. 24 may have a similar configuration and a similar operation to a display device 100 of FIG. 1 or a display device 1100 of FIG. 22, except that the display device 1300 may include the peripheral device 1350 along with or instead of a touch sensing device.

The display controller 1330 may transfer a timing signal STM representing a timing of a display operation to the peripheral device 1350, and may provide display driving information to the peripheral device 1350 by modulating the timing signal STM in a blank period of a frame period. In some embodiments, the peripheral device 1350 may include at least one of the touch sensing device for sensing a touch, an electro-magnetic resonance ("EMR") digitizer for sensing an EMR pen, a Wi-Fi device for performing Wi-Fi communication, and a Bluetooth device for performing Bluetooth communication.

As described above, in embodiments of the display device 1300, the display controller 1330 may transfer the timing signal STM to the peripheral device 1350, and may provide the display driving information to the peripheral device 1350 by modulating the timing signal STM in the blank period. Accordingly, the display driving information may be provided to the peripheral device 1350 without a dedicated channel for providing the display driving information, and interference between a display operation and an operation of the peripheral device 1350 may be reduced or prevented.

Figure 25:
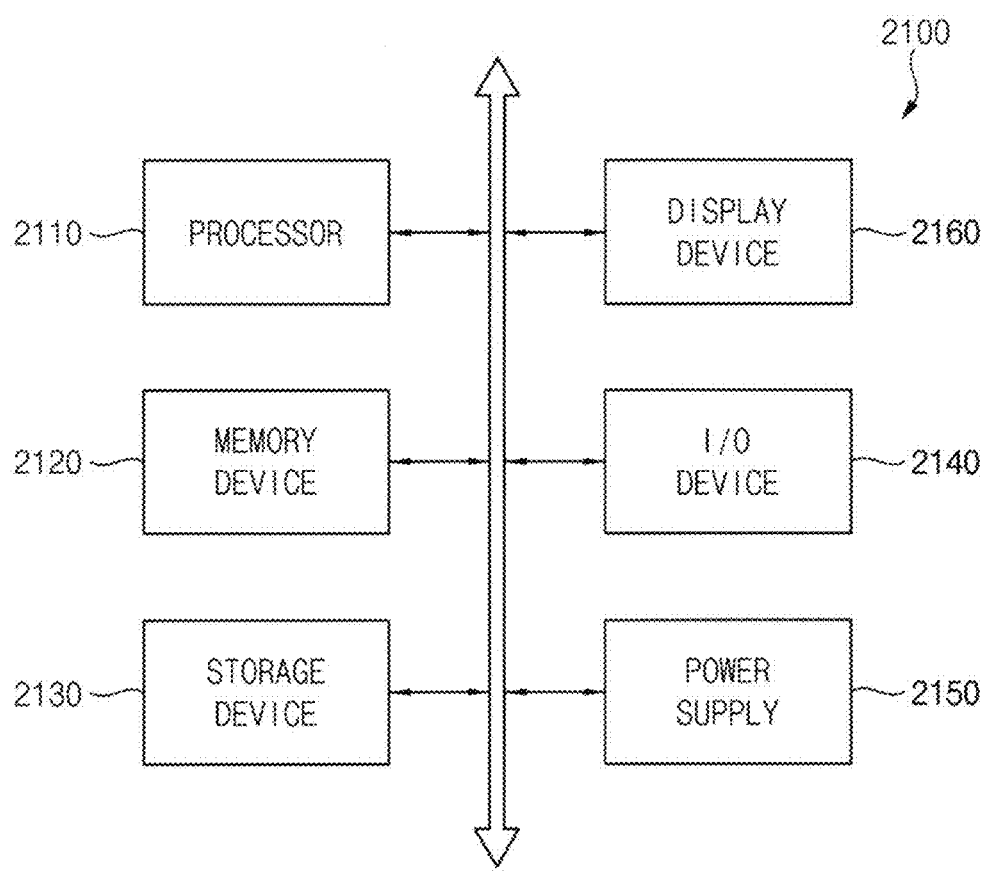
FIG. 25 is a block diagram illustrating another embodiment of an electronic device including a display device.

FIG. 25 is a block diagram illustrating an embodiment of an electronic device including a display device.

Referring to FIG. 25, an electronic device 2100 may include a processor 2110, a memory device 2120, a storage device 2130, an input/output ("I/O") device 2140, a power supply 2150, and a display device 2160. The electronic device 2100 may further include a plurality of ports for communicating a video card, a sound card, a memory card, a universal serial bus ("USB") device, other electric devices, etc.

The processor 2110 may perform various computing functions or tasks. In an embodiment, the processor 2110 may be an application processor ("AP"), a microprocessor, a central processing unit ("CPU"), etc. The processor 2110 may be coupled to other components via an address bus, a control bus, a data bus, etc. Further, in some embodiments, the processor 2110 may be further coupled to an extended bus such as a peripheral component interconnection ("PCI") bus.

The memory device 2120 may store data for operations of the electronic device 2100. In an embodiment, the memory device 2120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc., for example.

In an embodiment, the storage device 2130 may be a solid state drive ("SSD") device, a hard disk drive ("HDD") device, a CD-ROM device, etc. In an embodiment, the I/O device 2140 may be an input device such as a keyboard, a keypad, a mouse, a touch screen, etc., and an output device such as a printer, a speaker, etc. The power supply 2150 may supply power for operations of the electronic device 2100. The display device 2160 may be coupled to other components through the buses or other communication links.

In embodiment of the display device 2160, a display controller may transfer a timing signal to a peripheral device, and may provide display driving information to the peripheral device by modulating the timing signal in a blank period. Accordingly, the display driving information may be provided to the peripheral device without a dedicated channel for providing the display driving information, and interference between a display operation and an operation of the peripheral device may be reduced or prevented.

Embodiments of the invention may be applied to any electronic device 2100 including the display device 2160. In an embodiment, the invention may be applied to a mobile phone, a smart phone, a tablet computer, a television ("TV"), a digital TV, a three-dimensional ("3D") TV, a wearable electronic device, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
   a display panel which displays an image;
   a touch sensor which senses a touch;
   a display controller which drives the display panel; and
   a touch controller which drives the touch sensor,
   wherein the display controller transfers a timing signal representing a timing of a display operation to the touch controller, and provides display driving information to the touch controller by modulating the timing signal in a blank period of a frame period.

2. The display device of claim 1, wherein the display controller provides the display driving information to the touch controller by modulating at least one of:
   a pulse existence of the timing signal in each of horizontal time durations of the blank period;
   a pulse phase of the timing signal in the blank period; and
   a pulse width of the timing signal in the blank period.

3. The display device of claim 1, wherein the display driving information includes at least one of:
   frame rate information about a frame rate at which the display panel is driven;
   scan mode information for the display panel; and
   driving voltage information for the display panel.

4. The display device of claim 1, wherein the timing signal includes:
   a vertical synchronization signal representing a timing of the frame period; and
   a horizontal synchronization signal representing a timing of each of horizontal time durations.

5. The display device of claim 4, wherein the display controller transfers driving information data representing the display driving information to the touch controller in the blank period by encoding the horizontal synchronization signal in the blank period such that whether the horizontal synchronization signal has a pulse in each of horizontal time durations of the blank period is mapped to each bit of the driving information data.

6. The display device of claim 5, wherein the display controller toggles the vertical synchronization signal at a start time point of the blank period to inform the touch controller of a transfer start timing of the driving information data.

7. The display device of claim 5, wherein the display controller modulates the vertical synchronization signal such that the vertical synchronization signal has a first edge at a start time point of the blank period to inform the touch controller of a transfer start timing of the driving information data, and has a second edge at an end time point of the blank period to inform the touch controller of a transfer end timing of the driving information data.

8. The display device of claim 4, wherein the display controller transfers driving information data representing the display driving information to the touch controller in the blank period by encoding the horizontal synchronization signal in the blank period such that a phase of a pulse of the horizontal synchronization signal from a start time point of the blank period is mapped to the driving information data.

9. The display device of claim 8, wherein the display controller toggles the vertical synchronization signal at the start time point of the blank period to inform the touch controller of a transfer start timing of the driving information data.

10. The display device of claim 8, wherein the display controller modulates the vertical synchronization signal such that the vertical synchronization signal has a first edge at the start time point of the blank period to inform the touch controller of a transfer start timing of the driving information data, and has a second edge at an end time point of the blank period to inform the touch controller of a transfer end timing of the driving information data.

11. The display device of claim 4, wherein the display controller transfers driving information data representing the display driving information to the touch controller in the blank period by encoding the vertical synchronization signal in the blank period such that a width of a pulse of the vertical synchronization signal in the blank period is mapped to the driving information data.

12. The display device of claim 11, wherein the display controller periodically toggles the horizontal synchronization signal in the blank period.

13. The display device of claim 11, wherein the display controller maintains the horizontal synchronization signal at a constant level in the blank period to inform the touch controller of a transfer timing of the driving information data.

14. The display device of claim 4, wherein the display controller transfers driving information data representing the display driving information to the touch controller in the blank period by encoding the vertical synchronization signal in the blank period such that a phase of a pulse of the vertical synchronization signal from a start time point of the blank period is mapped to the driving information data.

15. The display device of claim 14, wherein the display controller periodically toggles the horizontal synchronization signal in the blank period.

16. The display device of claim 14, wherein the display controller maintains the horizontal synchronization signal at a constant level in the blank period to inform the touch controller of a transfer timing of the driving information data.

17. The display device of claim 1, wherein the timing signal includes:
    a data enable signal representing a timing of effective image data; and
    a horizontal synchronization signal representing a timing of each of horizontal time durations.

18. The display device of claim 17, wherein the display controller provides the display driving information to the touch controller by modulating at least one of:
    a pulse existence of the data enable signal in each of horizontal time durations of the blank period;
    a pulse phase of the data enable signal in the blank period; and
    a pulse width of the data enable signal in the blank period.

19. A display device comprising:
    a display panel which displays an image;
    a peripheral device; and
    a display controller which drives the display panel,
    wherein the display controller transfers a timing signal representing a timing of a display operation to the peripheral device, and provides display driving information to the peripheral device by modulating the timing signal in a blank period of a frame period.

20. The display device of claim 19, wherein the peripheral device includes at least one of:
    a touch sensing device which senses a touch;
    an electro-magnetic resonance digitizer which senses an electro-magnetic resonance pen;
    a Wi-Fi device which performs Wi-Fi communication; and
    a Bluetooth device which performs Bluetooth communication.

* * * * *